US012587127B2

(12) United States Patent
Wares et al.

(10) Patent No.: US 12,587,127 B2
(45) Date of Patent: Mar. 24, 2026

(54) PHOTOVOLTAIC MODULE MOUNTING ASSEMBLY

(71) Applicant: Unirac, Inc., Albuquerque, NM (US)

(72) Inventors: Brian Wares, Sacramento, CA (US);
Ethan Ely, Martinez, CA (US);
Sushrut Bapat, Alameda, CA (US);
Gary Rossi, Pleasant Hill, CA (US)

(73) Assignee: Unirac, Inc., Albuquerque, NM (US)

( * ) Notice: Subject to any disclaimer, the term of this patent is extended or adjusted under 35 U.S.C. 154(b) by 0 days.

(21) Appl. No.: 18/767,555

(22) Filed: Jul. 9, 2024

(65) Prior Publication Data

US 2024/0364255 A1     Oct. 31, 2024

Related U.S. Application Data

(62) Division of application No. 16/811,763, filed on Mar. 6, 2020, now Pat. No. 12,119,779.

(Continued)

(51) Int. Cl.
H02S 20/23     (2014.01)
E04D 3/24     (2006.01)
(Continued)

(52) U.S. Cl.
CPC ............... H02S 20/23 (2014.12); E04D 3/24 (2013.01); F16M 13/02 (2013.01); F24S 25/613 (2018.05);
(Continued)

(58) Field of Classification Search
CPC ......... E04D 3/24; F24S 25/613; F24S 25/615; F24S 25/632; F24S 2025/014;
(Continued)

(56) References Cited

U.S. PATENT DOCUMENTS 4,460,232 A     7/1984     Sotolongo
6,527,302 B1     3/2003     Gault et al.
(Continued)

FOREIGN PATENT DOCUMENTS

CN          206360229 U     7/2017
CN          206807356 U     12/2017
(Continued)

OTHER PUBLICATIONS

High-Quality Panels, DecoTech® Solar Roofing from GAF, Retrieved on Mar. 5, 2020, Retrieved from the Internet (https://www.gaf.com/en-us/residentialroofing/decotech/panels), 2 pages.
(Continued)

*Primary Examiner* — Jessie T Fonseca
(74) *Attorney, Agent, or Firm* — Lee & Hayes, P.C.

(57)          ABSTRACT
The present disclosure provides a bracket assembly for securing a photovoltaic (PV) module. The bracket assembly may include a bracket having a top portion and a bottom surface and a clip coupled to the bracket. The clip may include a hooked portion, wherein the clip is configured to be displaced by a PV module from a first position to a second position. The clip may be biased toward the first position, and the hooked portion may be configured to engage an edge feature of the PV module.

13 Claims, 36 Drawing Sheets

Related U.S. Application Data

(60) Provisional application No. 62/855,376, filed on May 31, 2019.

(51) Int. Cl.

| | |
|---|---|
| *F16M 13/02* | (2006.01) |
| *F24S 25/613* | (2018.01) |
| *F24S 25/615* | (2018.01) |
| *F24S 25/632* | (2018.01) |
| *H02G 3/08* | (2006.01) |
| *H02G 3/14* | (2006.01) |
| *H02S 30/10* | (2014.01) |
| *H02S 40/34* | (2014.01) |
| *F24S 25/00* | (2018.01) |
| *F24S 25/60* | (2018.01) |

(52) U.S. Cl.
CPC ........... *F24S 25/615* (2018.05); *F24S 25/632* (2018.05); *H02G 3/081* (2013.01); *H02G 3/088* (2013.01); *H02G 3/14* (2013.01); *H02S 30/10* (2014.12); *H02S 40/34* (2014.12); *F24S 2025/014* (2018.05); *F24S 2025/6004* (2018.05); *Y02E 10/47* (2013.01)

(58) Field of Classification Search
CPC .. F24S 2025/6004; H02S 20/23; H02S 30/10; H02S 40/34; Y02E 10/47
See application file for complete search history.

(56) References Cited

U.S. PATENT DOCUMENTS

| | | | |
|---|---|---|---|
| 7,259,337 | B1 | 8/2007 | Gretz |
| 7,432,439 | B2 | 10/2008 | Takada et al. |
| 7,626,118 | B1 | 12/2009 | Capozzi |
| 7,939,767 | B2 | 5/2011 | Tiefenthaler |
| 8,003,885 | B2 | 8/2011 | Richter et al. |
| 8,040,678 | B2 | 10/2011 | Tai et al. |
| 8,113,853 | B2 | 2/2012 | Coyle, Jr. et al. |
| 8,242,386 | B1 | 8/2012 | Baldwin et al. |
| 8,471,145 | B2 | 6/2013 | Suzuki et al. |
| 8,633,406 | B2 | 1/2014 | Bukovinszky et al. |
| 8,648,264 | B2 | 2/2014 | Masumoto et al. |
| 8,776,456 | B1 | 7/2014 | Schrock |
| 8,895,852 | B2 | 11/2014 | Sella et al. |
| 8,907,230 | B2 | 12/2014 | Chen et al. |
| 9,134,044 | B2 * | 9/2015 | Stearns ................... E04D 13/14 |
| 9,496,697 | B1 | 11/2016 | Wentworth |
| 9,531,319 | B2 * | 12/2016 | Braunstein ............ F24S 25/634 |
| 10,224,870 | B2 | 3/2019 | Lester et al. |
| 10,236,821 | B1 * | 3/2019 | Atia ........................ H02S 20/23 |
| 10,330,347 | B2 * | 6/2019 | Yang ..................... F24S 25/615 |
| 10,340,838 | B2 * | 7/2019 | Schuit ................... F24S 25/636 |
| 10,587,220 | B2 | 3/2020 | De Vogel et al. |
| 10,608,578 | B2 * | 3/2020 | Itou ......................... H02S 30/10 |
| 10,749,459 | B1 * | 8/2020 | Liu ....................... F16B 5/0685 |
| 10,951,157 | B1 * | 3/2021 | Young ..................... H02S 30/10 |
| 11,143,436 | B1 * | 10/2021 | Stephan ................ F24S 25/632 |
| 11,258,400 | B2 * | 2/2022 | Uppu ...................... H02S 30/00 |
| 12,255,574 | B2 | 3/2025 | Lemos et al. |
| 2011/0272545 | A1 * | 11/2011 | Liu .......................... F24F 13/32 248/222.14 |
| 2012/0006386 | A1 | 1/2012 | Klinga et al. |
| 2012/0312945 | A1 * | 12/2012 | McPheeters ............ F24S 25/61 248/228.2 |
| 2014/0202523 | A1 | 7/2014 | Guo |
| 2014/0223838 | A1 * | 8/2014 | West ..................... F24S 25/636 52/60 |
| 2014/0338729 | A1 * | 11/2014 | Newman ................. F24S 25/20 136/251 |
| 2015/0129020 | A1 | 5/2015 | Klinga et al. |
| 2015/0365044 | A1 * | 12/2015 | McPheeters ............ E04D 13/00 248/237 |
| 2016/0025262 | A1 * | 1/2016 | Stearns ................... E04D 13/10 248/220.22 |
| 2017/0025987 | A1 * | 1/2017 | Stearns ................... H02S 30/10 |
| 2017/0207743 | A1 | 7/2017 | Lemos et al. |
| 2017/0346440 | A1 | 11/2017 | Lester et al. |
| 2018/0226918 | A1 | 8/2018 | De Vogel et al. |
| 2019/0013772 | A1 * | 1/2019 | Bamat ................... F24S 25/636 |
| 2019/0049151 | A1 * | 2/2019 | Harris ................... F24S 25/636 |
| 2019/0178274 | A1 * | 6/2019 | Katz ....................... F16B 2/065 |
| 2019/0334333 | A1 | 10/2019 | Wade et al. |
| 2020/0313604 | A1 * | 10/2020 | Harris ..................... F16B 2/065 |
| 2021/0184626 | A1 * | 6/2021 | Yang ..................... F24S 25/634 |
| 2022/0010823 | A1 | 1/2022 | Moss et al. |
| 2025/0274073 | A1 | 8/2025 | Wares et al. |
| 2025/0293631 | A1 | 9/2025 | Wares et al. |

FOREIGN PATENT DOCUMENTS

| | | |
|---|---|---|
| CN | 108173486 A | 6/2018 |
| CN | 207518511 U | 6/2018 |
| CN | 213477440 U | 6/2021 |
| CN | 213897854 U | 8/2021 |
| EP | 2108898 A1 | 10/2009 |
| JP | 2001193231 A | 7/2001 |
| JP | 2002004517 A | 1/2002 |
| JP | 2002146978 A | 5/2002 |
| JP | 2010248854 A | 11/2010 |
| JP | 2013122120 A | 6/2013 |
| WO | WO2021/076970 A1 | 6/2012 |
| WO | WO2022/024777 A1 | 2/2022 |

OTHER PUBLICATIONS

Office Action for U.S. Appl. No. 19/199,031, dated Jul. 1, 2025, 10 pages.
Office Action for U.S. Appl. No. 19/224,278, dated Jul. 14, 2025, 12 pages.
Office Action for U.S. Appl. No. 19/199,031, dated Oct. 14, 2025; 13 pages.
Office Action for U.S. Appl. No. 19/224,278, dated Oct. 16, 2025; 9 pages.

* cited by examiner

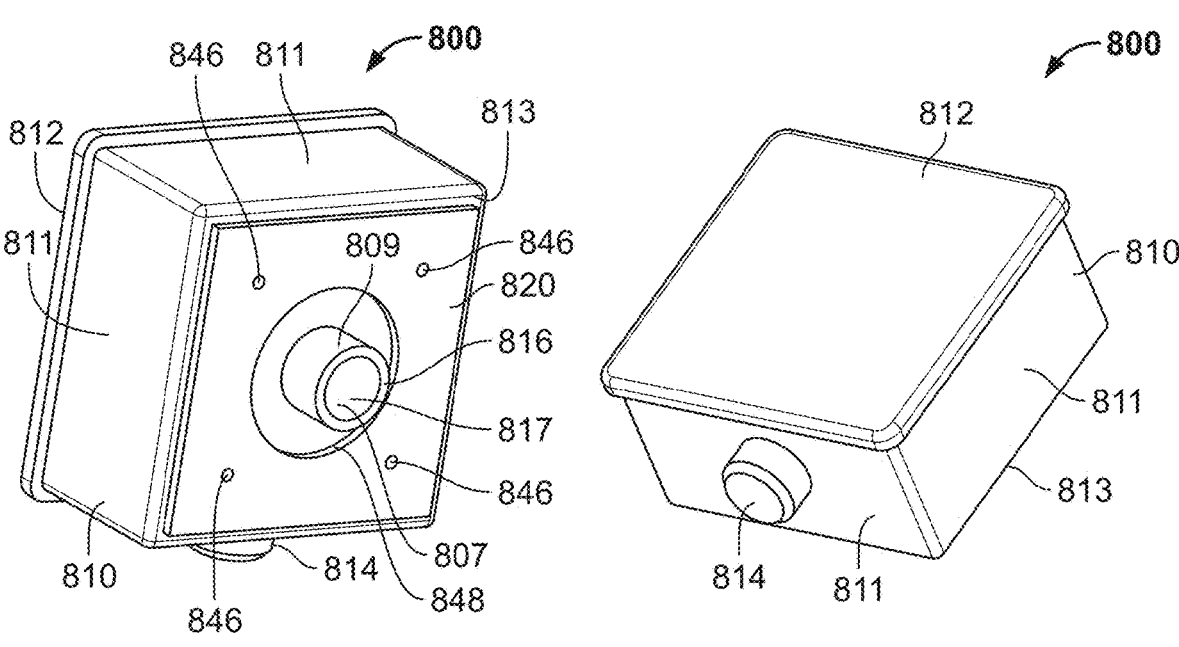
FIG. 25A
FIG. 25B
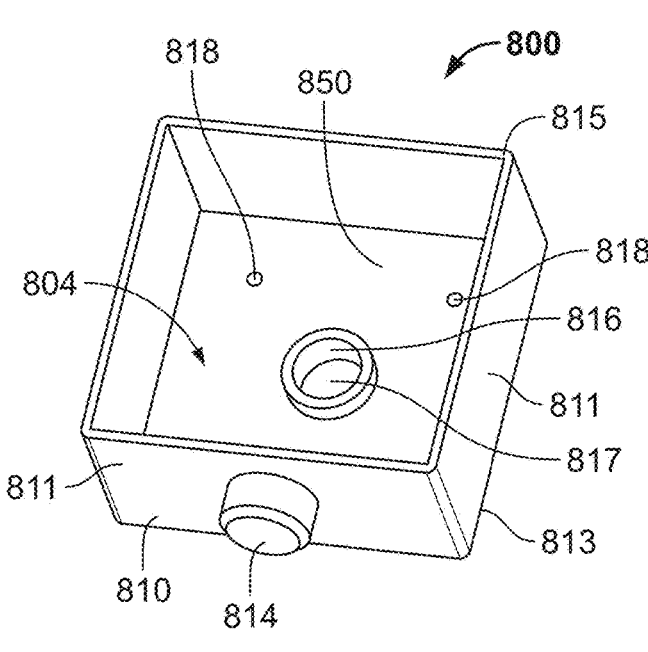
FIG. 26

800

832

832

832

812

832

811

811

814

810

822

824

822

813

822

826 832

826

812

832

826

832

832

826

828

817 815

828

808

808

828

808

808

811

811

810

814

813

828

806

848

820

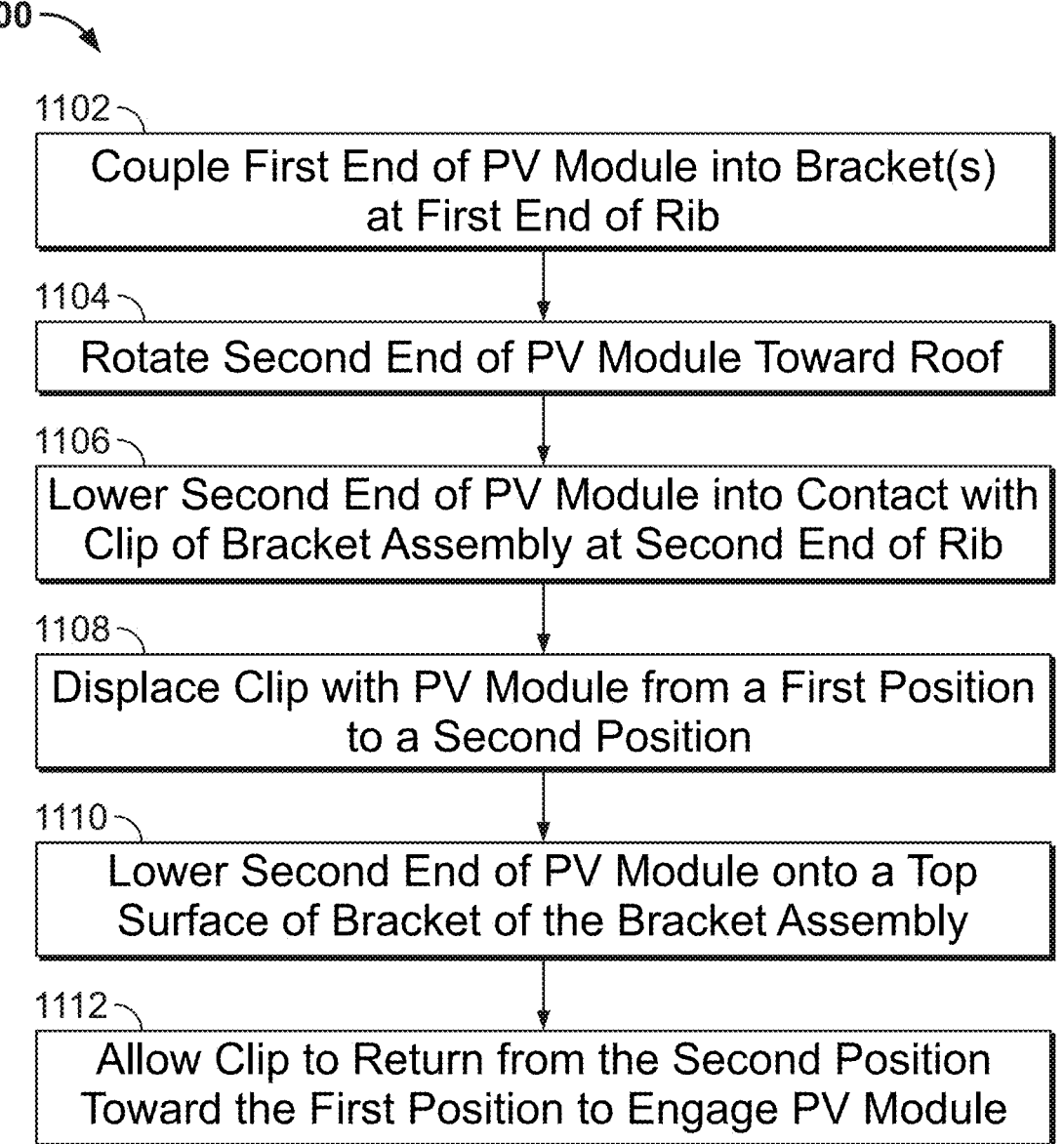

1100

1102
Couple First End of PV Module into Bracket(s)
at First End of Rib

1104
Rotate Second End of PV Module Toward Roof

1106
Lower Second End of PV Module into Contact with
Clip of Bracket Assembly at Second End of Rib 1108
Displace Clip with PV Module from a First Position
to a Second Position 1110
Lower Second End of PV Module onto a Top
Surface of Bracket of the Bracket Assembly 1112
Allow Clip to Return from the Second Position
Toward the First Position to Engage PV Module

FIG. 32

PHOTOVOLTAIC MODULE MOUNTING ASSEMBLY

CROSS REFERENCE TO RELATED APPLICATIONS

This application is a Divisional Application of U.S. Application No. 16/811,763 filed Mar. 6, 2020, which claims priority to U.S. Provisional Application No. 62/855,376, filed May 31, 2019, the entire contents of each of which are incorporated by reference herein.

FIELD

The present disclosure relates to roof mounting systems. In particular, embodiments relate to roof mounting systems for photovoltaic modules.

BACKGROUND

Photovoltaic (PV) cells, commonly known as solar cells, are devices for converting solar radiation into electrical energy. PV cells can be assembled into PV modules (also known as solar panels) having a plurality of PV cells, which may be used to convert sunlight into electricity. The electricity produced by the PV modules may be transmitted by cables for residential and/or commercial use.

Several PV modules may be included in a PV module system, for example, where the PV modules are mounted on an external structure or a support surface, such as a roof of a building. Often, it is desirable for PV modules to have a low profile so they are unobtrusive and aesthetically pleasing. Current low profile PV module systems can typically only be installed onto new roofs because they include several underlayment materials that are installed prior to installation of the modules. Consequently, for existing roofs, the support structure for the PV modules and associated flashing usually are installed over shingles, tiles, or other roofing material. This can give a bulky appearance and make the PV modules more noticeable.

Furthermore, the installation process for most PV modules is time consuming due to the need for precise measurement and alignment, and the time it takes to install numerous fasteners throughout the entire installation process in order to secure all of the components to the roof. And, as the installation time increases, so does the cost of labor, which may discourage consumers from using PV modules as a power source.

Accordingly, there is a need for a photovoltaic module mounting system that offers the advantages of the features and functionalities of the present disclosure, for example, easier and faster installation.

BRIEF SUMMARY

The present disclosure is directed to roof mounting systems for photovoltaic (PV) modules having improved ease of installation. Embodiments of the PV module mounting assemblies disclosed herein include a roofing panel designed to be integrated directly with a roof deck, or with roofing materials, such as shingles or tiles. Flexible flashing may be included in the assemblies to accommodate installation of PV modules when roofing materials have already been installed onto the roof. The PV module mounting assemblies may also include bracket assemblies attached, for example, to ribs on the roofing panel. In some embodiments, the bracket assemblies include one or more clip which interfaces with a portion of a PV module to secure the PV module to a roof while also aligning the PV module in the appropriate position.

For example, in some embodiments, a PV module mounting assembly includes a roofing panel having a plurality of ribs, a flashing panel coupled along an edge of the roofing panel, and a bracket assembly coupled to a rib, the bracket assembly including a bracket and a clip. In some embodiments, the clip is configured to be coupled with an edge feature of a PV module (e.g., a protrusion or a lip of a PV module frame, a PV laminate edge of a frameless PV module, or any other feature extending from an edge of a PV module) to secure the PV module to the roofing panel.

In some embodiments, the bracket assembly for securing the PV module includes a bracket having a top portion and a pair of legs disposed on opposing sides of the top portion, and a clip coupled to the bracket. In some embodiments, the clip includes a hooked portion. In some embodiments, the clip is configured to be displaced by a PV module from a first position to a second position. For example, in some embodiments, the clip is biased towards the first position, and the hooked portion is configured to engage an edge feature of the PV module when the clip returns from the second position to the first position.

In some embodiments, a PV module mounting assembly includes a roofing panel having a base layer, a flashing panel coupled along an edge of the roofing panel, and a bracket assembly coupled to the roofing panel. In some embodiments, a bracket assembly is coupled to the roofing panel. In some embodiments, the bracket assembly includes a bracket and a clip, where the clip is configured to couple with an edge feature of a PV module to secure the PV module to the roofing panel. In some embodiments, the mounting assembly includes a plurality of roofing panels.

In some embodiments, the roofing panel includes a plurality of ribs extending from the base layer, where the bracket assembly is coupled to a first rib of the plurality of claims. In some embodiments, the ribs and the roofing panel are integrally formed. In some embodiments, each of the roofing panels of the plurality of roofing panels includes a plurality of ribs extending from the base layer. In some embodiments, the plurality of roofing panels are arranged into an array such that at least one rib of a first roofing panel of the plurality of roofing panels at least partially overlaps a second roofing panel of the plurality of roofing panels.

In some embodiments, the PV module mounting assembly further includes a second bracket assembly coupled to a second rib, where the second rib is laterally spaced apart from the first rib, and where the second bracket assembly is configured to couple with a second edge feature of the PV module. In some embodiments, the second bracket assembly includes a second bracket and a stationary clip.

In some embodiments, the bracket assembly further includes a first grounding component. In some embodiments, the first grounding component has a cone shape, and is configured to contact the PV module. In some embodiments, the PV module mounting assembly further includes a second rib and a second grounding component disposed on a bottom surface of the second rib.

In some embodiments, at least a portion of the roofing panel includes a grip surface disposed on an upper surface of the base layer.

In some embodiments, the flashing includes a base layer and a raised portion, where the raised portion is disposed over a portion of the first rib. In some embodiments, the flashing panel includes a flexible portion configured to integrate with a roof. In some embodiments, a portion of the flashing panel is configured to extend upward with respect to the base layer. In some embodiments, the flashing panel includes a stepped or curved profile configured to facilitate water runoff from the roofing panel.

In some embodiments, the flashing panel includes a first head flashing portion, a second head flashing portion, and a third head flashing portion, where the first head flashing portion, the second head flashing portion, and the third head flashing portion are configured to be separated from each other.

In some embodiments, each of the ribs of the plurality of ribs include a sealant pad.

In some embodiments, a bracket assembly for securing a PV module includes a bracket having a top portion and a bottom surface and a clip coupled to the bracket, the clip including a hooked portion. In some embodiments, the clip is configured to be displaced by a PV module from a first position to a second position. In some embodiments, the clip is biased toward the first position. In some embodiments, the hooked portion is configured to engage an edge feature of the PV module.

In some embodiments, the clip is coupled to a spring, and the spring is configured to bias the clip toward the first position. In some embodiments, the spring is disposed in a channel within a top portion of the bracket. In some embodiments, the channel is defined by a first raised portion of the top portion of the bracket and a second raised portion of the top portion of the bracket.

In some embodiments, the hooked portion includes a sloped upper portion. In some embodiments, the sloped upper portion is disposed at an angle within a range of from approximately 30° to approximately 60° with respect to an upper surface of the top portion of the bracket. In some embodiments, the hooked portion includes an undercut lower portion having a lip, where the lip is configured to engage the edge feature of the PV module. In some embodiments, the hooked portion is configured to engage the edge feature of the PV module when the clip returns from the second position to the first position.

In some embodiments, the bracket further includes a pair of legs extending from opposing sides of the top portion.

Some embodiments are directed to methods for installing a PV module on a roof. In some embodiments, the method includes: securing a first roofing panel to a roof decking, where the first roofing panel includes a plurality of ribs; coupling a first edge of the PV module to a first bracket assembly disposed at a first end of a first rib of the plurality of ribs; rotating the PV module toward the first roofing panel; and coupling a second edge of the PV module to a second bracket assembly disposed at a second end of the first rib. In some embodiments, the second bracket assembly includes a bracket and a clip coupled to the bracket. In some embodiments, coupling the second edge of the PV module to the second bracket assembly includes displacing the clip from a first position to a second position.

In some embodiments, the method for installing the PV module on a roof further includes biasing the clip to move from the second position toward the first position until the clip engages the second edge of the PV module.

In some embodiments, the clip is biased by a spring coupled to the clip. In some embodiments, the clip includes a hooked portion configured to engage the second edge of the PV module.

In some embodiments, coupling the first edge of the PV module to the first bracket assembly forms a grounding path from the PV module to the bracket assembly. In some embodiments, the grounding path is formed from the PV module to the bracket assembly via a first grounding component having a portion disposed above a top surface the first bracket assembly, and from the bracket assembly to the roof via a second component disposed on a bottom surface of the first rib and contacting the roofing panel.

In some embodiments, the method for installing the PV module on a roof further includes securing a second roofing panel to the roof decking adjacent to the first roofing panel, wherein the second roofing panel comprises a plurality of ribs. In some embodiments, the second roofing panel is positioned such that a first of the plurality of ribs of the second roofing panel overlaps a first of the plurality of ribs of the first roofing panel. In some embodiments, the second roofing panel is positioned such that edge portions of the plurality of ribs of the second roofing panel overlap edge portions of the plurality of ribs of the first roofing panel. In some embodiments, a first bracket assembly of a first rib of the first roofing panel is positioned to align with a second bracket assembly of a first rib of the second roofing panel.

BRIEF DESCRIPTION OF THE FIGURES

The accompanying drawings, which are incorporated herein and form part of the specification, illustrate embodiments and, together with the description, further serve to explain the principles of the embodiments and to enable a person skilled in the relevant art(s) to make and use the embodiments.

FIG. 14A illustrates a step in an installation process of a photovoltaic module according to an embodiment.

FIG. 25A is a bottom perspective view of a junction box according to an embodiment.

FIG. 25B illustrates a top perspective view of the junction box of FIG. 25A.

FIG. 26 illustrates a top perspective view of a junction box according to an embodiment.

FIG. 32 is a flow chart illustrating a process for installing a PV module to a roof according to an embodiment.

Figure 1:
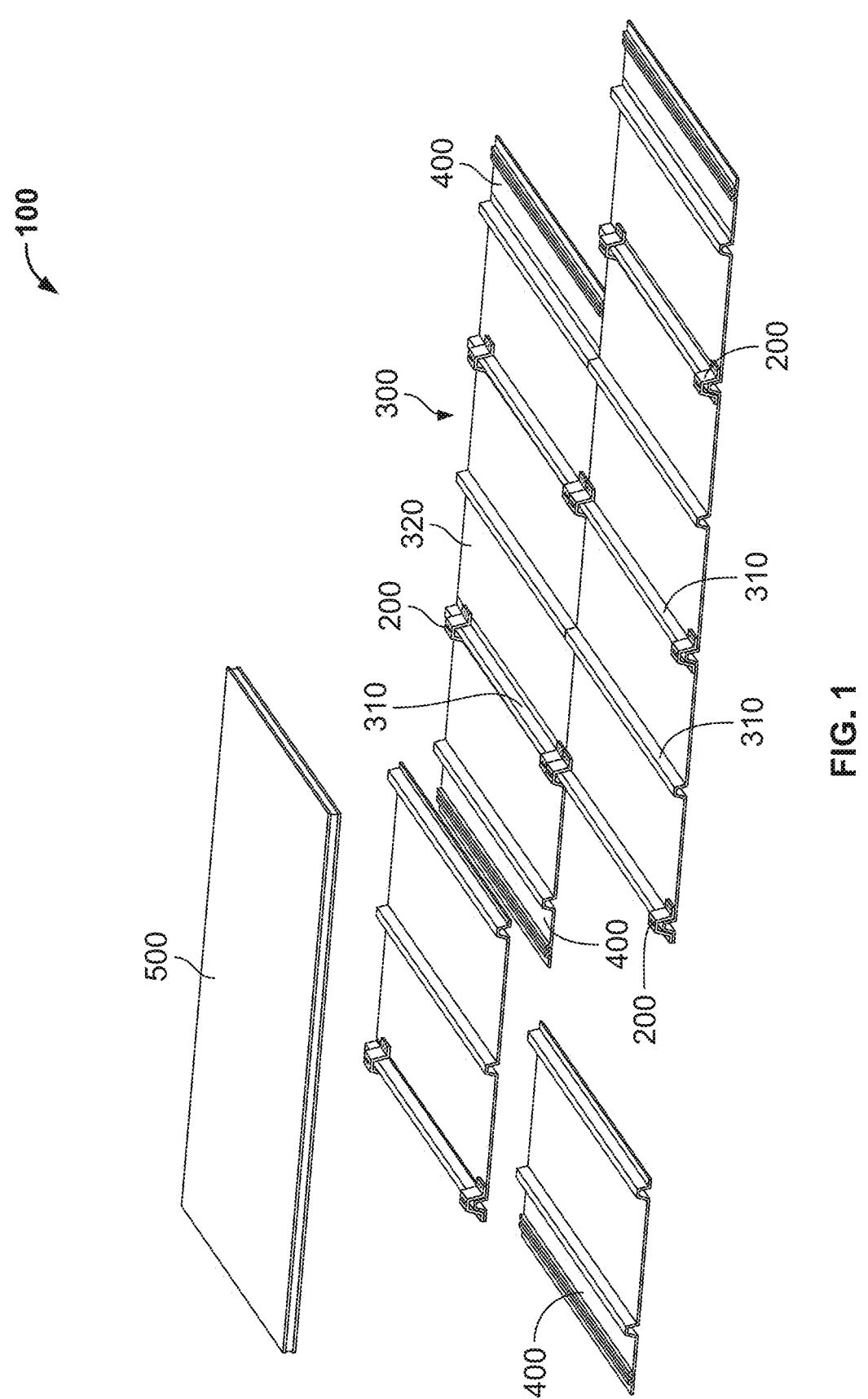
FIG. 1 illustrates a photovoltaic mounting system according to an embodiment.

The features and advantages of the embodiments will become more apparent from the detailed description set forth below when taken in conjunction with the drawings. A person of ordinary skill in the art will recognize that the drawings may use the same or different reference numbers for identical, functionally similar, and/or structurally similar elements, and that different reference numbers do not necessarily indicate distinct embodiments or elements. Likewise, a person of ordinary skill in the art will recognize that functionalities described with respect to one element are equally applicable to functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," "certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "about" or "substantially" or "approximately" as used herein refer to a considerable degree or extent. When used in conjunction with, for example, an event, circumstance, characteristic, or property, the term "about" or "substantially" or "approximately" can indicate a value of a given quantity that varies within, for example, 1-15% of the value (e.g., $\pm 1\%$, $\pm 2\%$, $\pm 5\%$, $\pm 10\%$, or $\pm 15\%$ of the value), such as accounting for typical tolerance levels or variability of the embodiments described herein.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Photovoltaic (PV) cells, or solar cells, are often installed, for example, on the roofs of homes and businesses as an alternative source of electricity. The installation process typically includes installing a base, such as a roofing panel or, a series of rails onto a roof, installing flashing to prevent leakage through the roof, and attaching PV modules consisting of several PV cells to the base. Depending on the type of PV module mounting system being used, the base may be installed directly onto roof decking, for example when a roof is first being built or when it is being replaced, or the PV modules may be installed over existing roofing materials, such as shingles or tiles. In order for the PV modules to maintain a desirably low profile and appear to be integrated with the roofing materials, it is beneficial to install the PV modules directly onto the roof decking. Otherwise, the base and flashing may be visible. Additionally, installation over roofing materials may result in added height to the overall mounting system, which may be less aesthetically pleasing.

The PV module installation process typically involves extensive measurement in order to ensure the PV modules align precisely with the roofing panel or rails and/or with other PV modules in the PV array. If the PV modules are not aligned, they may be difficult to secure and may not connect or align properly to adjacent modules. The measurement and alignment process is often time consuming, which may add to the overall cost and timeline of the project, making installation more difficult. Therefore, it is often easiest to install the modules in rows, or another predetermined pattern, which may limit where the modules are placed.

Another factor that affects installation time is the number and type of fasteners that are used to secure the PV modules to the roof or rails. These fasteners are often installed manually, for example, threaded screws or bolts. The labor associated with the installation of these fasteners takes a significant amount of time, which also adds to the overall cost and timeline of the project.

Figure 16:
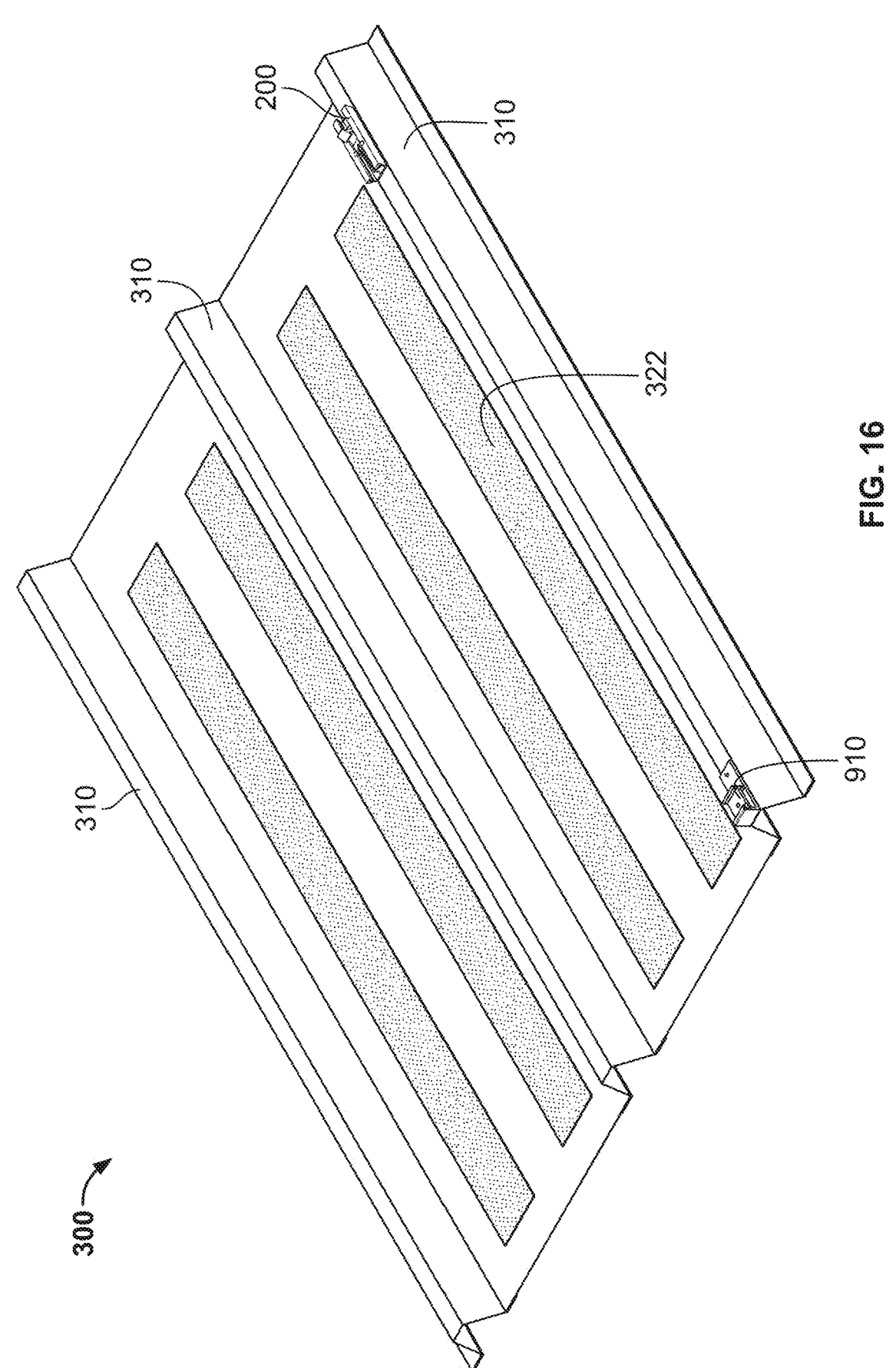
FIG. 16 illustrates a roofing panel according to an embodiment.

The PV module mounting assemblies disclosed herein solve these problems. For example, in some embodiments, a PV module mounting assembly may be installed either directly onto roof decking (e.g., of a new roof or replacement roof), or retrofit over preexisting roofing materials, while maintaining a low profile. As shown, for example, in FIG. 1, PV mounting system 100 includes a roofing panel 300 having a base layer 320 and a plurality of ribs 310 protruding upward from base layer 320. In some embodiments, the roofing panel 300 may include a sealant pad coupled to a bottom surface to help repel water from the underside of roofing panel 300. In some embodiments, for example as shown in FIG. 16, roofing panel 300 includes a grip surface 322, which may improve safety of an installer during the installation process by providing traction when an installer steps on grip surface 322. For example, grip surface 322 may include one or more strips of material having a high friction coefficient. Grip surface 322 may cover all, or a portion of, the top surface of roofing panel 300.

Figure 17:
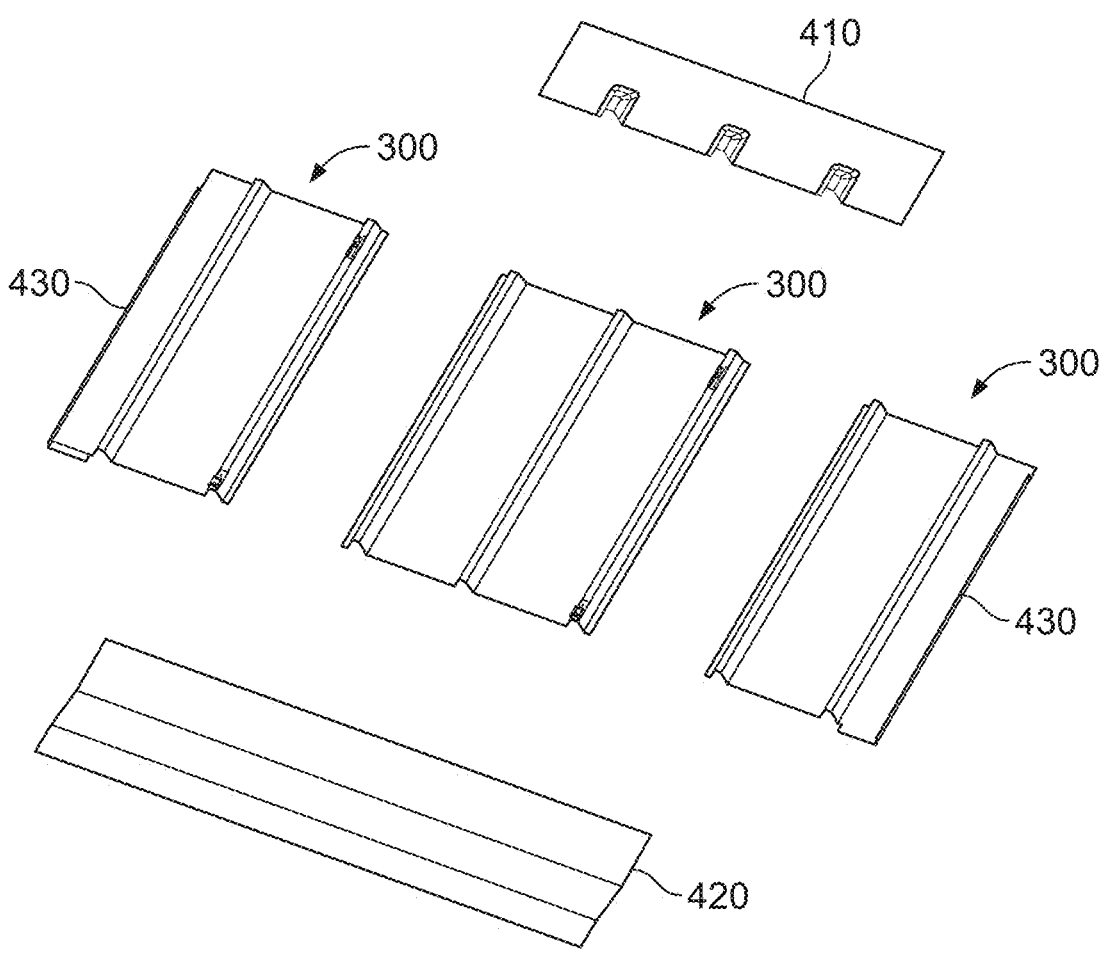
FIG. 17 illustrates an exploded view of a roofing panel assembly according to an embodiment.

As also shown in FIG. 1, disposed on ribs 310 are a plurality of bracket assemblies 200, which may be used to connect a PV module, for example PV module 500, to roofing panel 300. In some embodiments, also included in PV mounting system 100 is flashing 400, which as shown in FIG. 17 for example, may be coupled to any of a top (i.e., head flashing 410), side (i.e., side flashing 430), or bottom edge (i.e., toe flashing 420) of roofing panel 300. In some embodiments, flashing 400 has a profile that facilitates water runoff from the roofing panel. For example, flashing 400 may have a stepped profile or a curved profile, as shown, for example, in FIG. 9.

Figure 2:
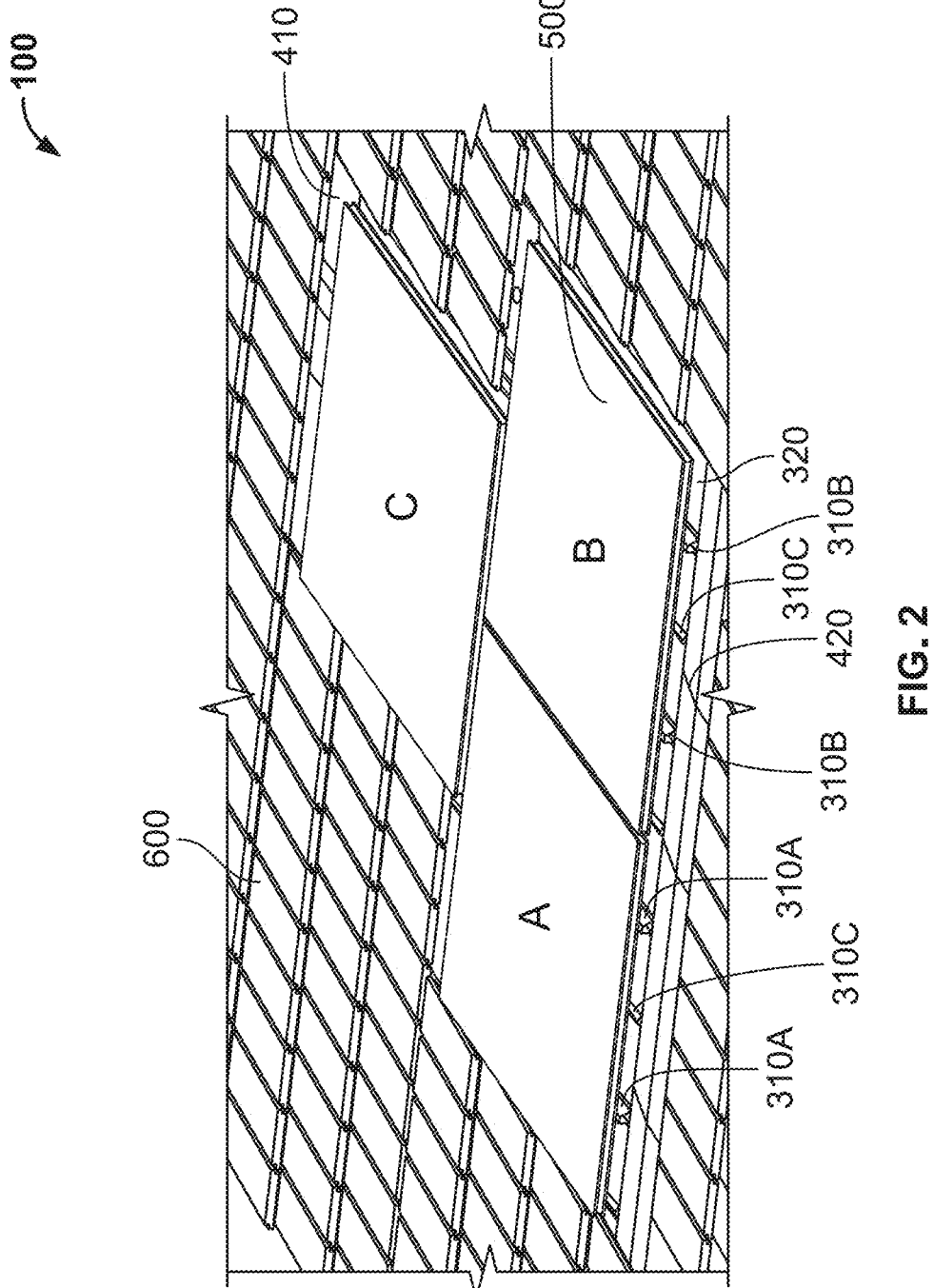
FIG. 2 illustrates a photovoltaic mounting system installed on a roof according to an embodiment.

In some embodiments, PV mounting system 100 may be installed directly onto roof decking, as shown for example in FIG. 2. In some embodiments, PV mounting system 100 may be installed to the roof decking and adjacent to roofing materials, for example shingles or tiles, that have already been installed on the roof. This flexibility allows for PV mounting system 100 to be installed on both new and previously-existing roofs.

Figure 24:
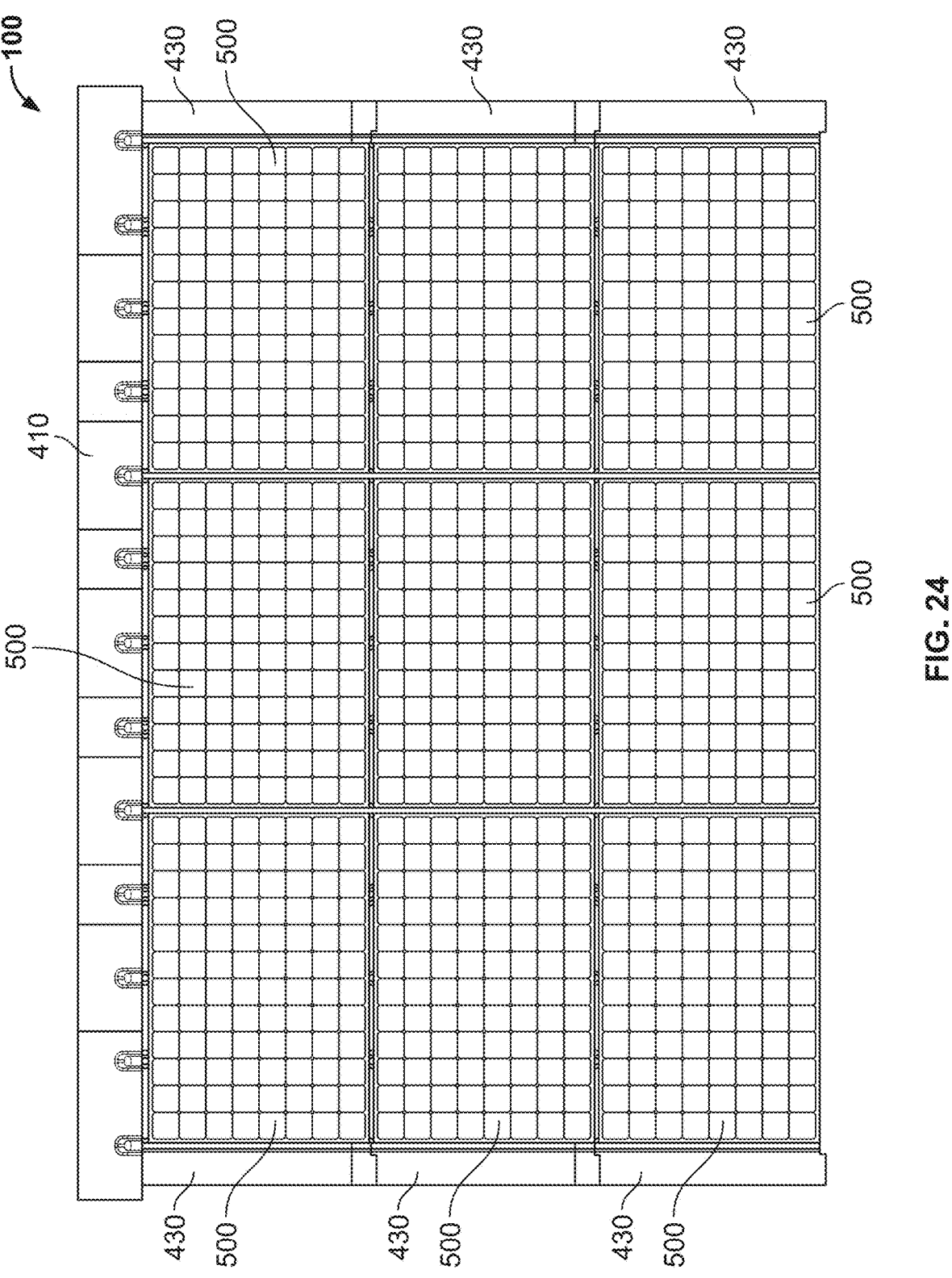
FIG. 24 illustrates a top view of a photovoltaic mounting system installed on a roof according to an embodiment.

As illustrated in FIG. 2, for example, PV mounting system 100 may have a low profile, such that a height of the PV modules 500 with respect to the roof is less than approximately six inches above the roofing material 600. In some embodiments, roofing 600 may be installed around head flashing 410 and toe flashing 420. In some embodiments, head flashing 410 and/or toe flashing 420 may include a flexible portion that may integrate with roofing 600. As illustrated in FIG. 24, for example, PV mounting system 100 may also include side flashing panels 430.

In some embodiments, for example as illustrated in FIG. 24, PV modules 500 may be installed onto a roof in an array of rows and/or columns. PV modules 500 may be installed such that the gap between adjacent PV modules 500 is minimized to create a uniform appearance. In some embodiments, PV modules 500 may be installed prior to installation of toe flashing 420, for example as illustrated in FIG. 24. However, in some embodiments, toe flashing 420 may be installed prior to installation of PV modules 500.

Figures 4C, 5A:
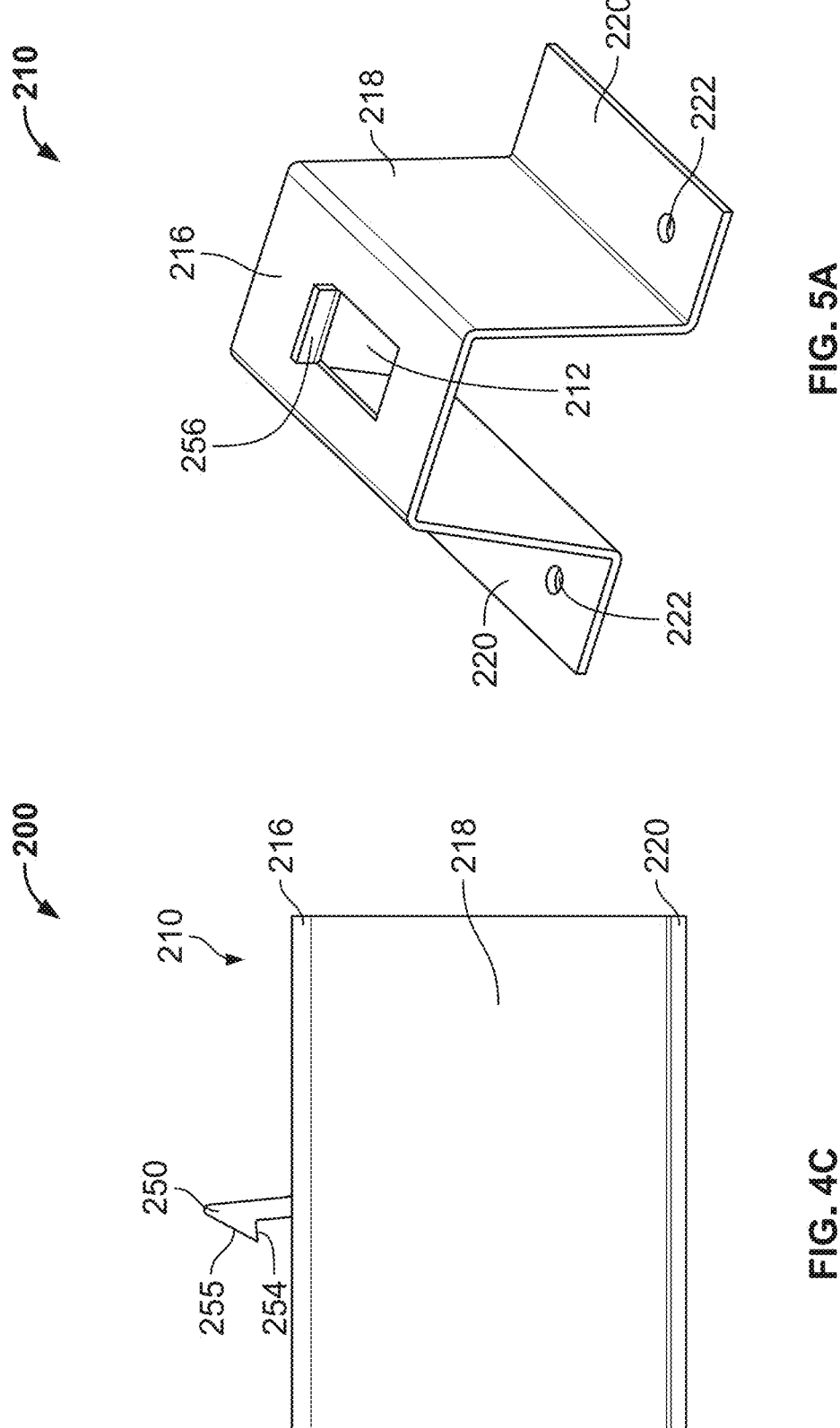
FIG. 4C illustrates a side view of the bracket assembly of FIG. 4B according to an embodiment.
FIG. 5A illustrates a bracket according to an embodiment.
Figure 5B:
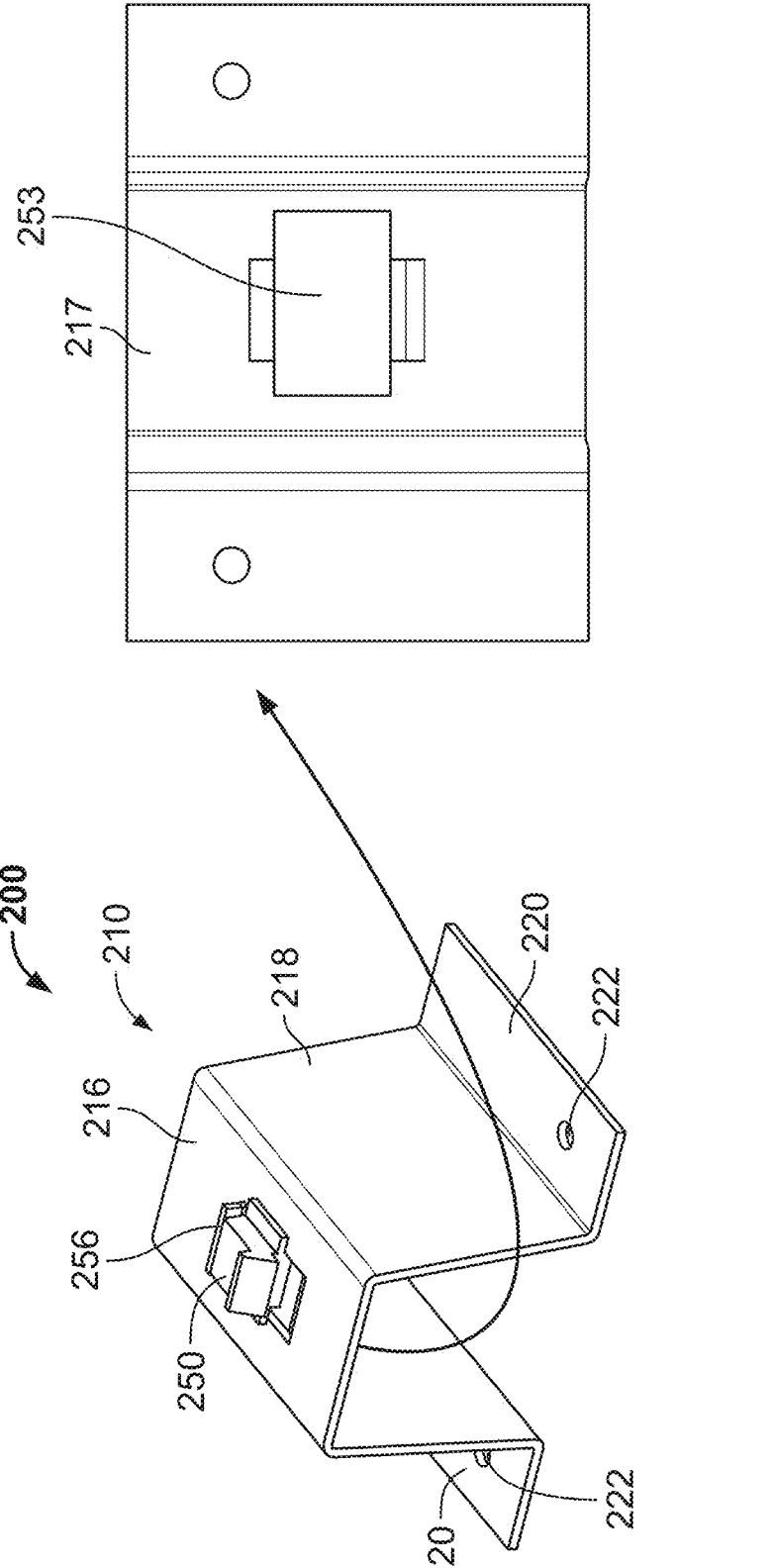
FIG. 5B illustrates the bracket of FIG. 5A included in a bracket assembly according to an embodiment.
Figures 5C, 6A:
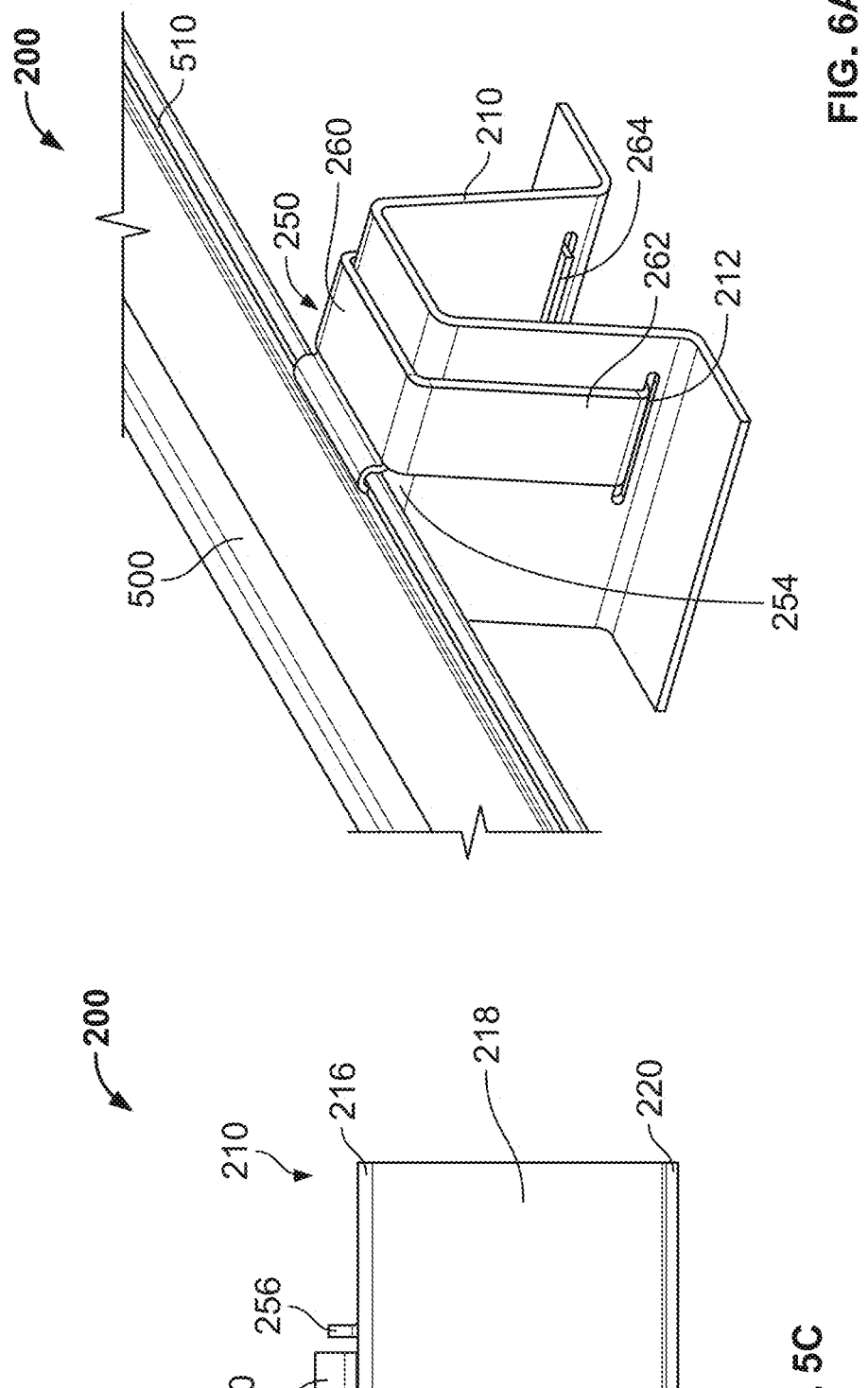
FIG. 5C illustrates a side view of the bracket assembly of FIG. 5B according to an embodiment.
FIG. 6A illustrates a bracket assembly according to an embodiment.
Figure 7:
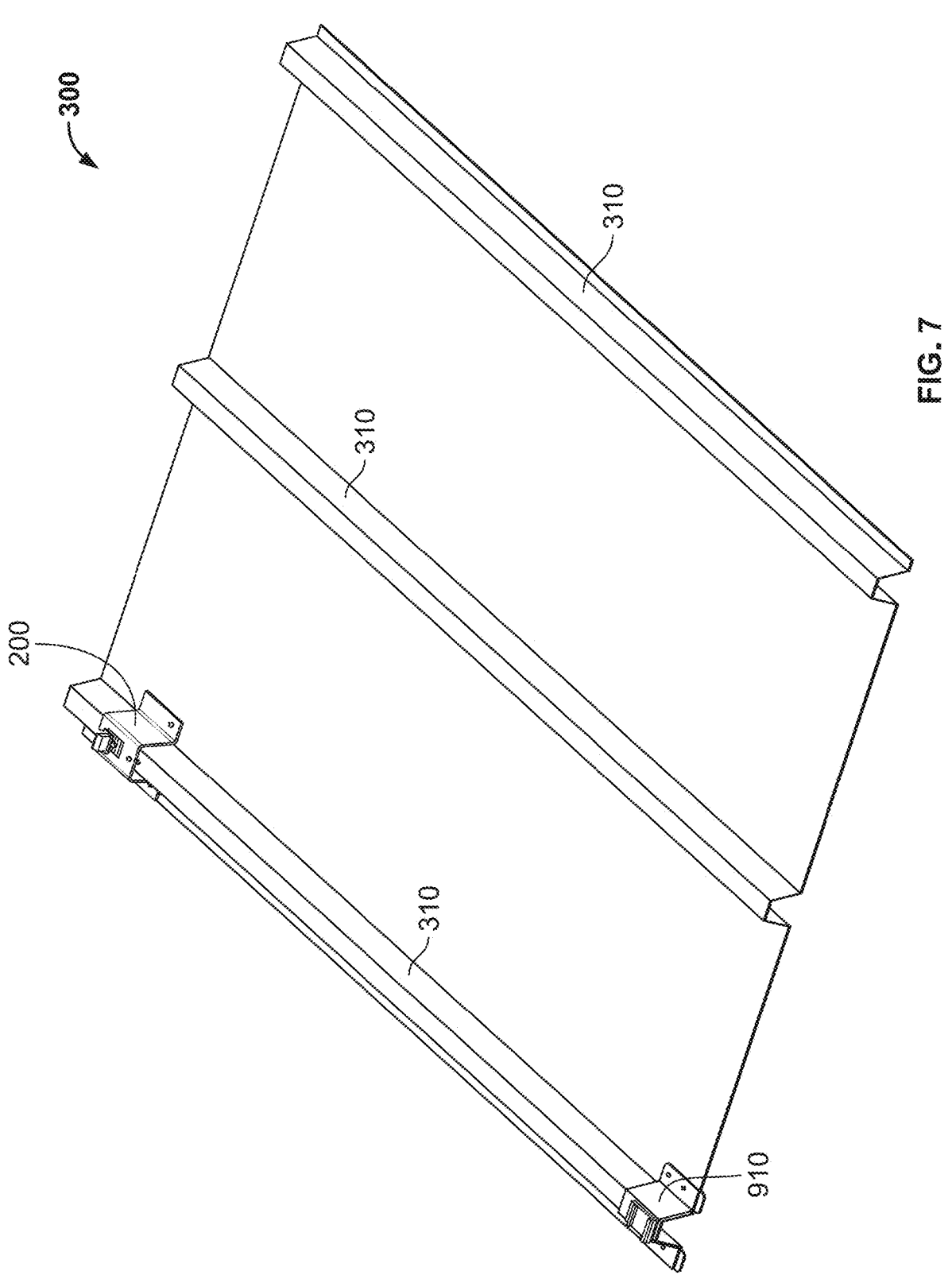
FIG. 7 illustrates a roofing panel according to an embodiment.

FIGS. 3A-3C, 4A-4C, and 5A-5C illustrate embodiments of bracket assembly 200. In some embodiments, bracket assembly 200 may include a bracket 210 and a clip 250 coupled to bracket 210. In some embodiments, bracket 210 may include a top portion 216, a pair of legs 218 extending downward from top portion 216, and a foot 220 extending outward from each of legs 218 in a direction generally parallel to a base layer of a roofing panel, for example base layer 320, as shown in FIG. 7. In some embodiments, feet 220 may include one or more through holes 222 to accommodate fasteners which may be used to secure bracket 210 to, for example, base layer 320 of roofing panel 300.

In some embodiments, bracket 210 may be dimensioned to fit over a rib 310; however, in some embodiments, legs 218 may be flexible in order to fit over ribs having various sizes or shapes. In some embodiments, bracket 210 may include a single leg 218, for example, coupled to a first side of a rib 310. In some embodiments, bracket 210 may not have any legs, such that the top portion 216 of bracket 210 is simply coupled to the top of a rib 310. In some embodiments, bracket 210 may be integrally formed with a rib 310. In some embodiments, bracket 210 may be secured directly to rib 310 and/or base layer 320. For example, in some embodiments, bracket 210 may be fixed to rib 310 and/or base layer 320 via adhesives and/or via interlocking components, for example via a snap fit. In some embodiments, bracket 210 may be integrally formed with rib 310 and/or base layer 320.

Figure 14A:
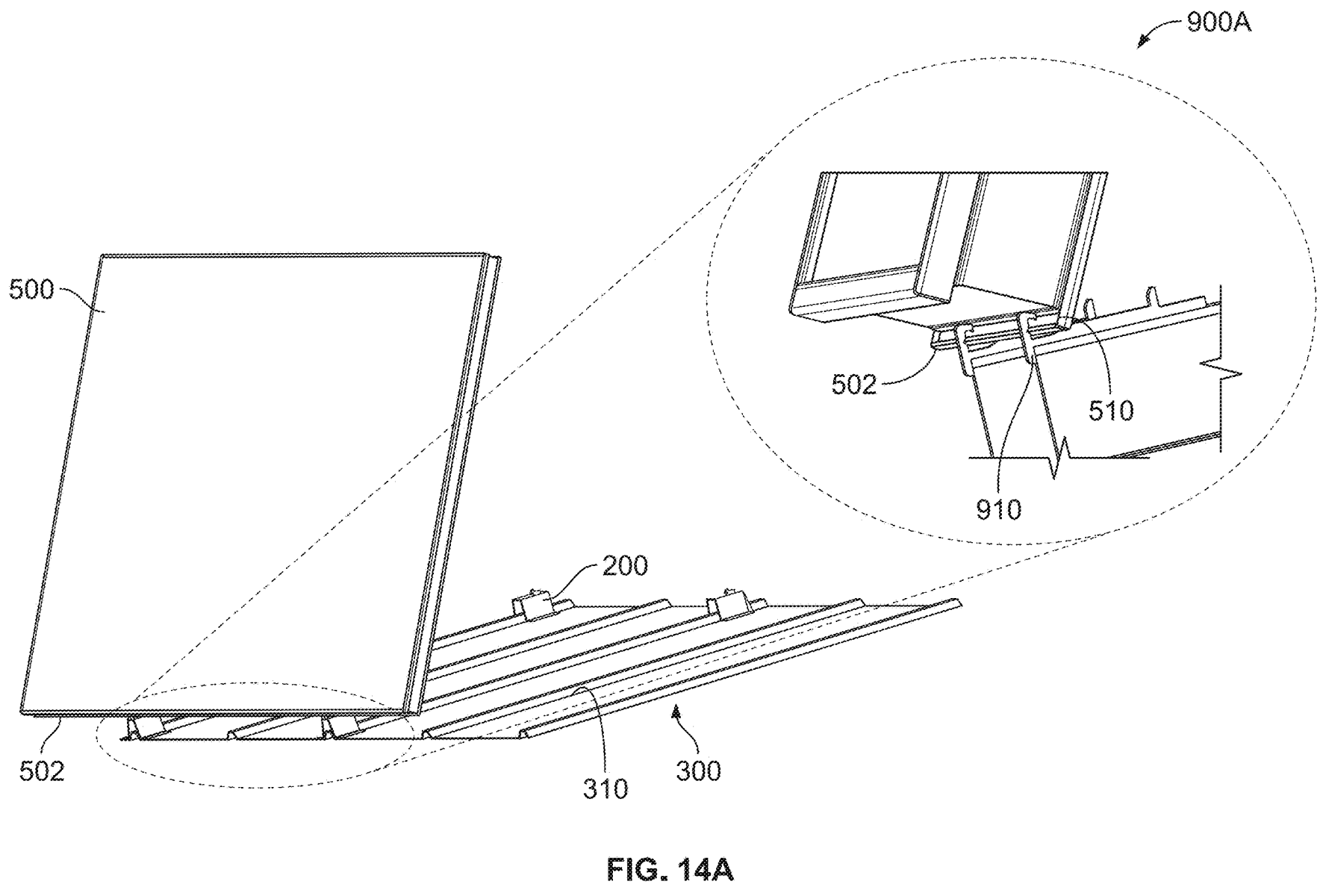
Figure 14B:
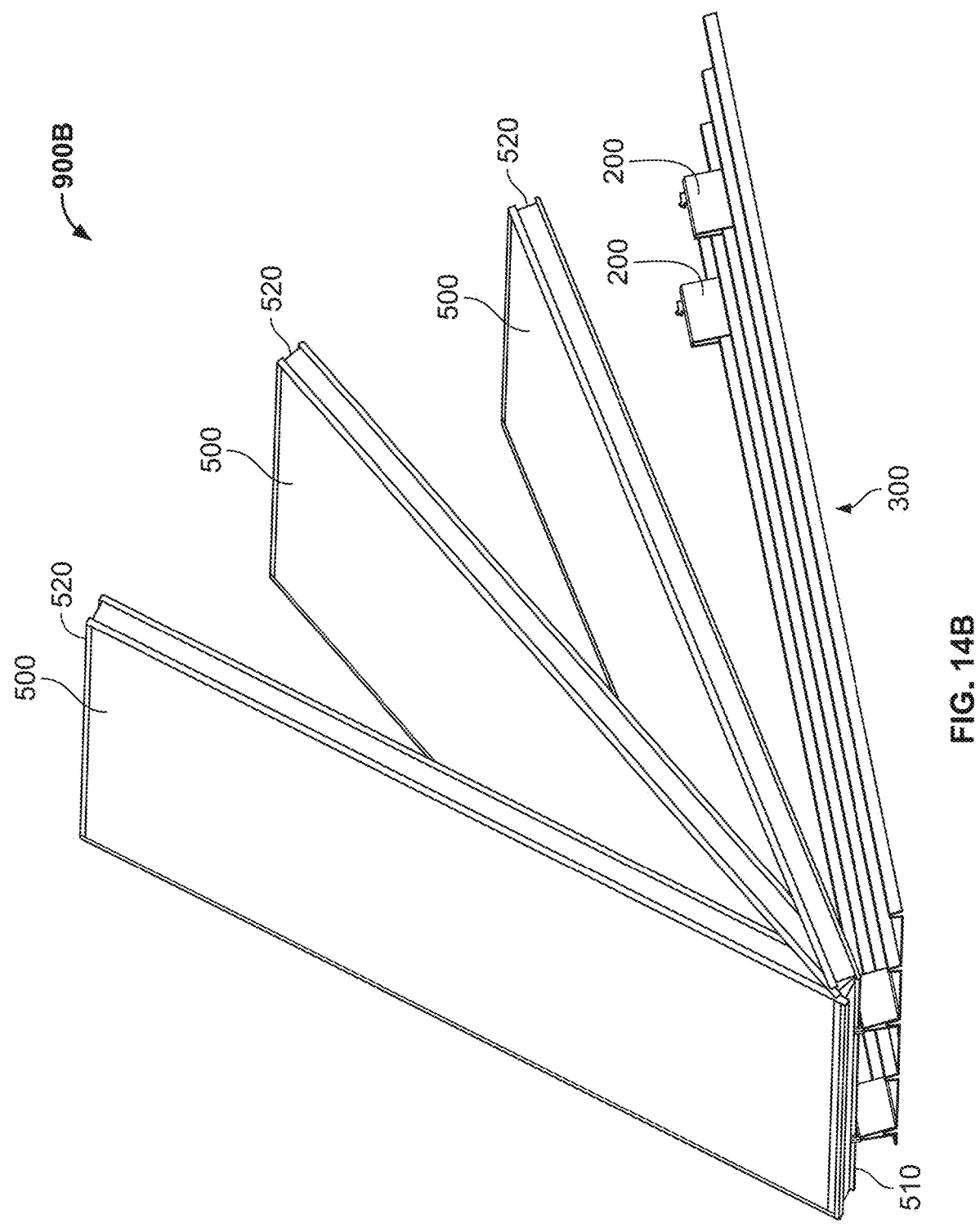
FIG. 14B illustrates a step in an installation process of a photovoltaic module according to an embodiment.

In some embodiments a seal may be disposed between bracket 210 and rib 310 to help prevent water from seeping in between bracket 210 and rib 310. In some embodiments, a first bracket may be coupled to a first rib, a second bracket may be coupled to a second rib, and the first rib may be laterally spaced apart from the second rib such that a PV module may be installed horizontally across the ribs. For example, the first bracket may be configured to couple with a first edge feature of a PV module, for example lip 510 shown in FIGS. 14A and 14B, and the second bracket may be configured to couple with a second edge feature of the same PV module, for example edge 520 shown in FIG. 14B. In some embodiments, edge 520 may have the same structure as lip 510.

In some embodiments, top portion 216 of bracket 210 may include one or more through hole 212 through which clip 250 is coupled to bracket 210. In some embodiments, a fastener, for example fastener 252 (e.g., a screw, bolt, pin, etc.), shown in FIG. 3B, may extend through hole 212. In some embodiments, top portion 216 includes an elongate opening, for example elongate opening 214, shown in FIGS. 3A and 3B. Elongate opening 214 may accommodate rotation of a portion of clip 250 about an axis extending through a point, for example through fastener 252 which may be disposed on through hole 212.

Figure 4A:
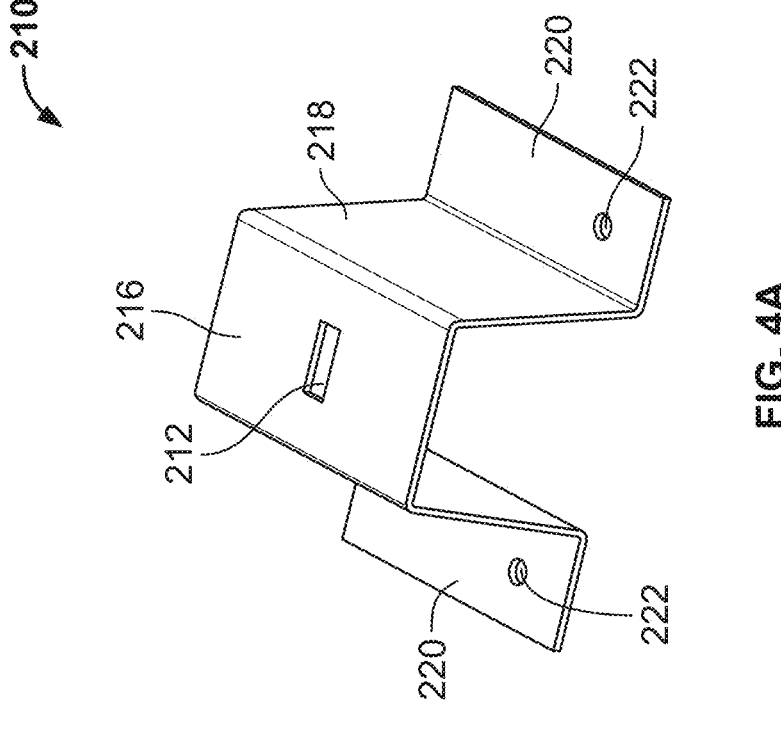
FIG. 4A illustrates a bracket according to an embodiment.

In some embodiments, through hole 212 may be dimensioned to accommodate various types of clips that are not secured to bracket 210 with a fastener. For example, as shown in FIG. 4A, through hole 212 is a slot through which clip 250, shown in FIG. 4B, extends. Similarly, as shown in FIG. 5A, through hole 212 is an elongate slot through which clip 250, shown in FIG. 5B, extends. Clip 250 shown in FIGS. 4A and 4B may be attached to bracket 210, for example, with a securing member 253, which is coupled to a bottom face 217 opposite of top portion 216.

Figures 3A, 3B:
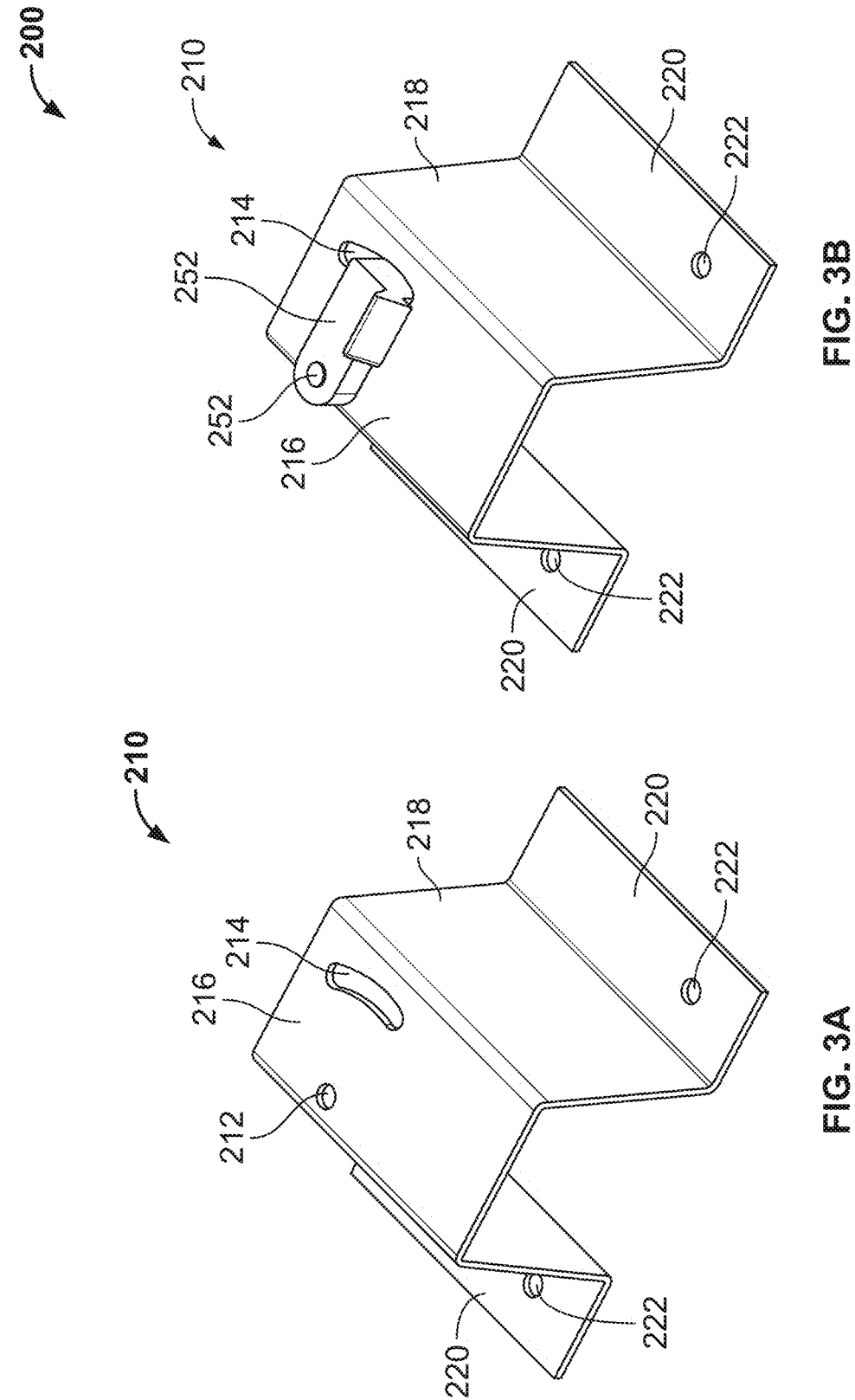
FIG. 3A illustrates a bracket according to an embodiment.
FIG. 3B illustrates the bracket of FIG. 3A included in a bracket assembly according to an embodiment.

As will be described in greater detail below, to facilitate installation of PV modules, clips 250 are designed to be displaced by a PV module that comes into contact with clip 250, such that clip 250 moves from a first position to a second position, and clip 250 then moves back to the first position once the PV module is set down, thereby locking the PV module in place. In some embodiments, clips 250 may be biased to a first position, for example the positions shown in FIGS. 3B and 4B. During installation, a PV module, for example PV module 500, may press against clip 250, pushing it to a second position, allowing the PV module to drop down and rest on top portion 216 of bracket 210. In some embodiments, for example as shown in FIG. 3B, clip 250 is displaced rotationally. During rotation, clip 250 may move, for example, within elongate opening 214.

Due to the biasing, clip 250 may then move back to the first position, over a portion of the PV module (e.g., an edge feature on an edge of the PV module), thereby securing the PV module to an roofing panel, for example roofing panel 300. Accordingly, installation of additional fasteners to secure the PV modules is not necessary, making the installation of the PV modules quick and efficient.

Figure 4B:
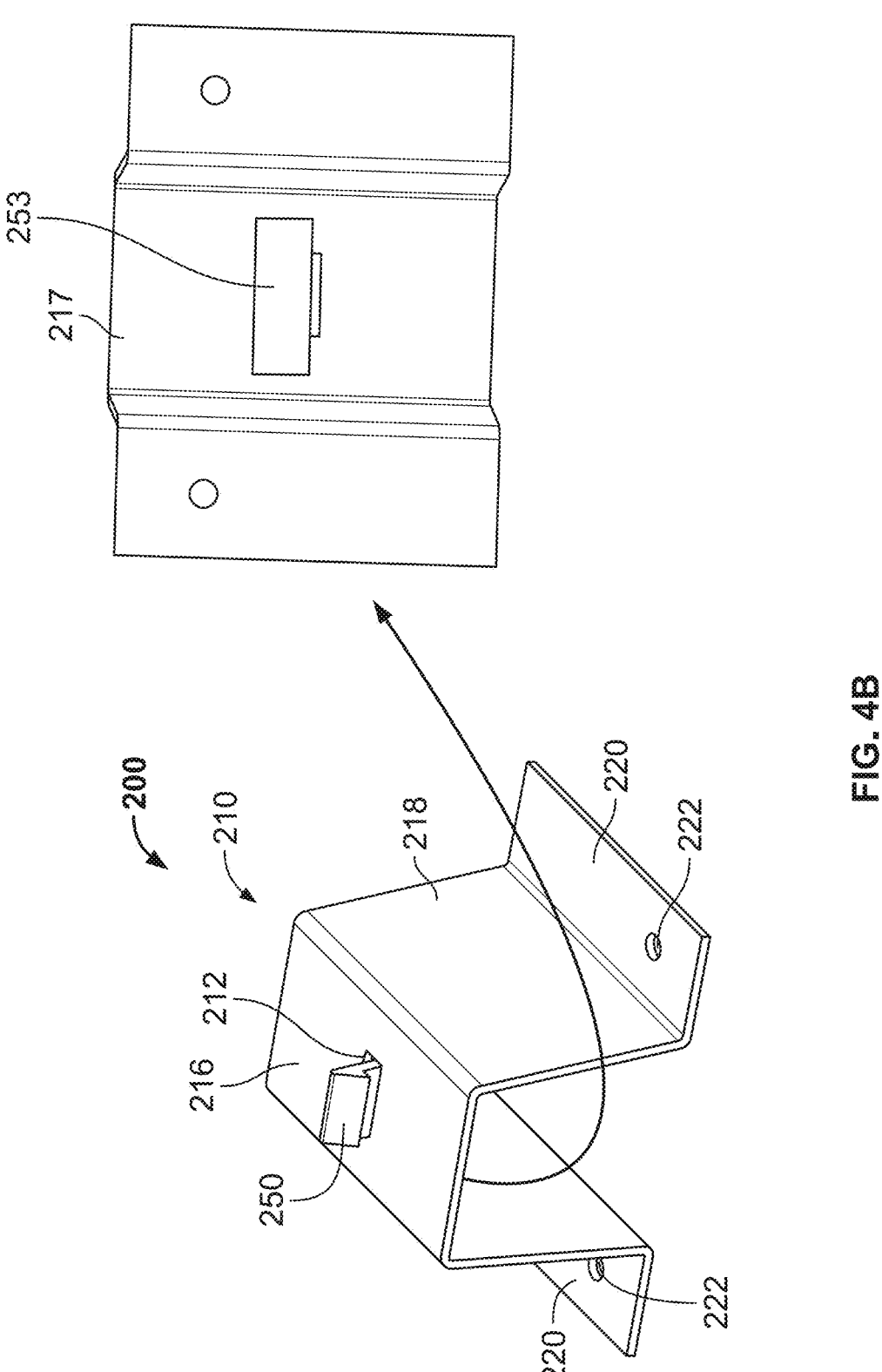
FIG. 4B illustrates the bracket of FIG. 4A included in a bracket assembly according to according to an embodiment.

In some embodiments, for example, as shown in FIG. 4B, clip 250 may rock backward in response to being pushed by a PV module. Accordingly, the size of through hole 212 may restrain clip 250 such that the angle to which clip 250 may rock is restricted. By restricting the movement of clip 250, clip 250 may move quickly back to the first position after being displaced to the second position.

Similarly, in some embodiments, bracket 210 includes a backstop 256 extending upwardly from top portion 216. In some embodiments, backstop 256 may be perpendicular to top portion 216. In some embodiments, for example as shown in FIG. 5B, instead of rotating, clip 250 may be displaced linearly. Backstop 256 may limit this translational movement of clip 250 such that clip 250 may move back to the first position quickly after being displaced to the second position (e.g., where clip 250 contacts backstop 256).

Figure 3C:
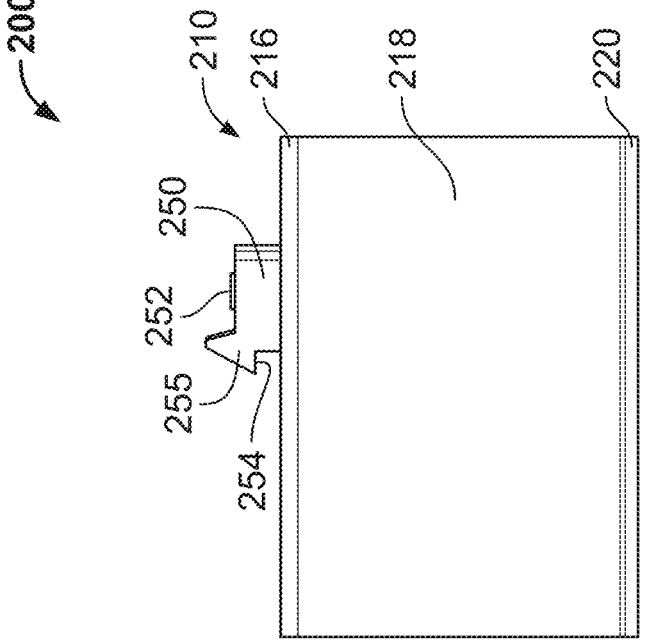
FIG. 3C illustrates a side view of the bracket assembly of FIG. 3B.

As described above, clip 250 may be displaced by a PV module during installation. In some embodiments, to facilitate this interaction, clip 250 may include an angled portion 255, for example, as shown in FIGS. 3C, 4C, and 5C. Angled portion 255 may allow the PV module to displace clip 250 while sliding down onto top portion 216 of bracket 210. In some embodiments, clip 250 may also include a hook portion 254, which may engage with a portion of a PV module, for example edge feature 510, described below, and shown, for example, in FIGS. 14C and 14D.

Figures 6B, 6C:
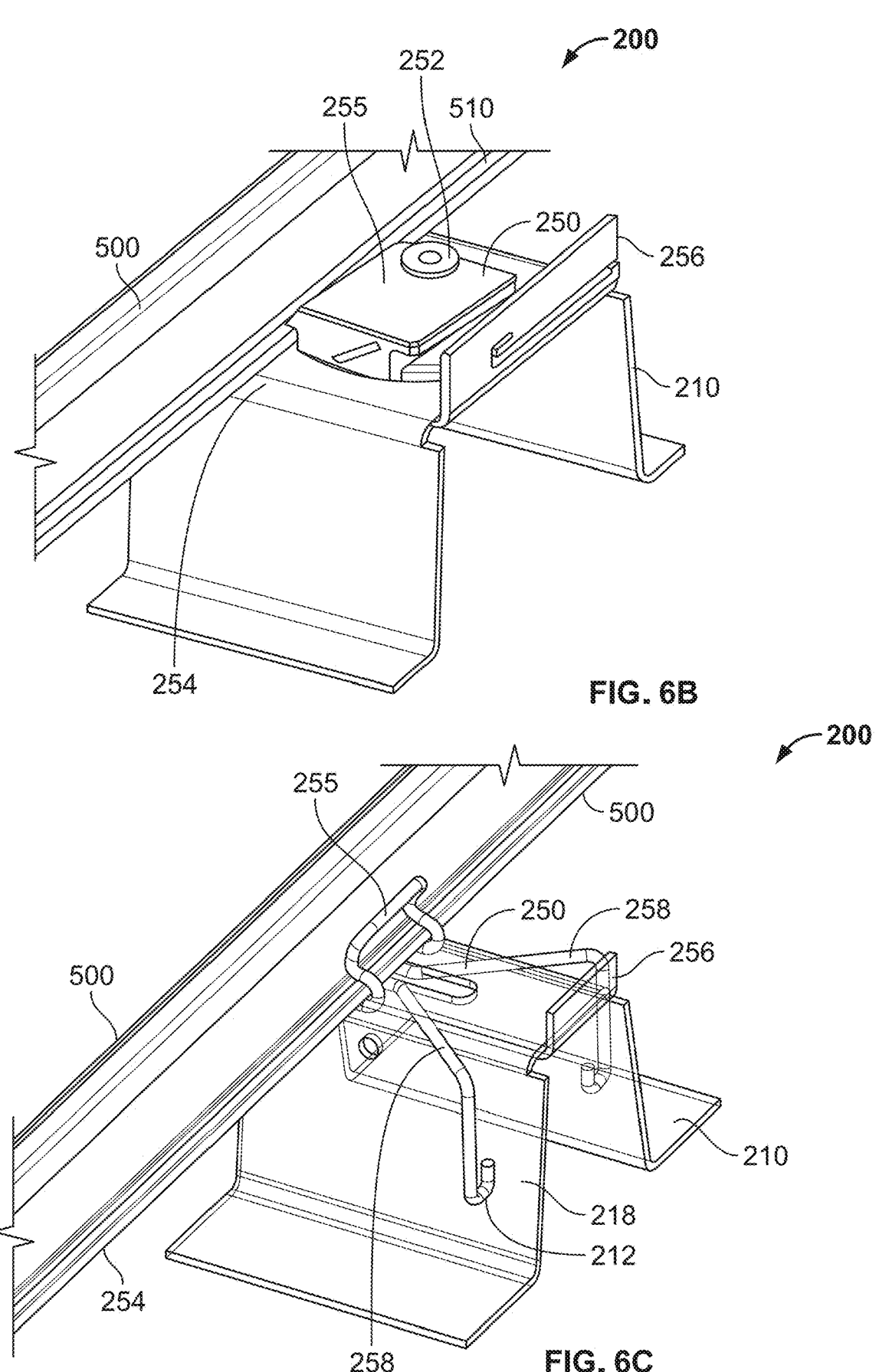
FIG. 6B illustrates a bracket assembly according to an embodiment.
FIG. 6C illustrates a bracket assembly according to an embodiment.
Figure 6D:
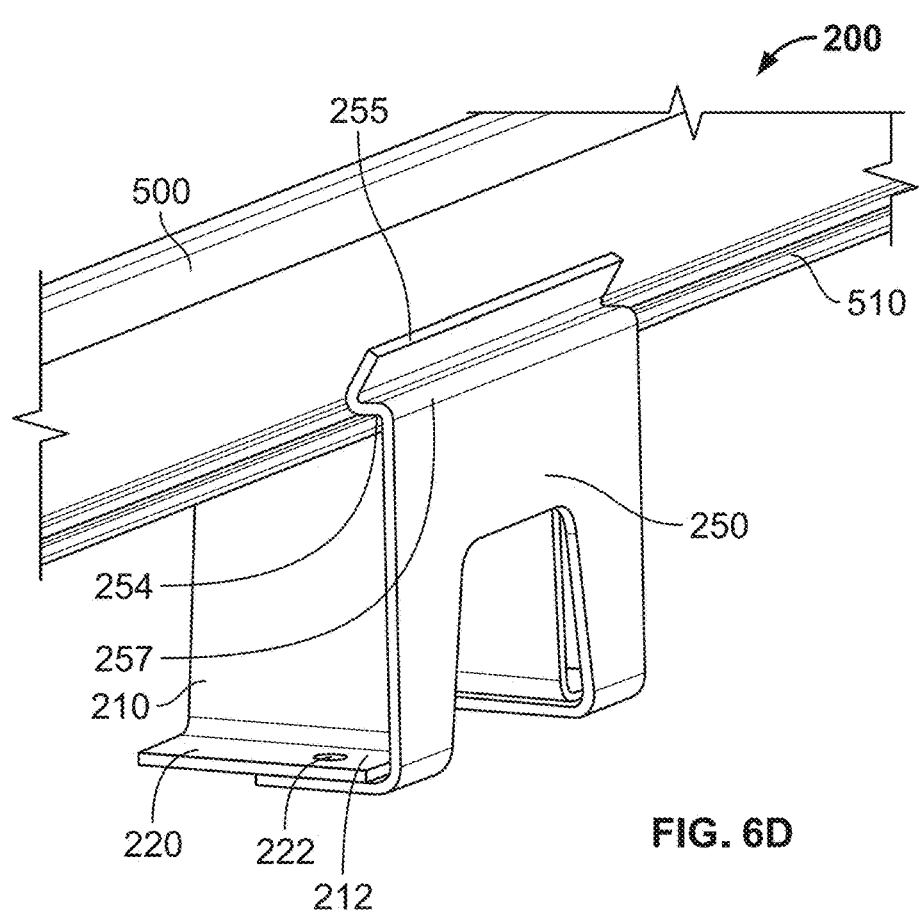
FIG. 6D illustrates a bracket assembly according to an embodiment.
Figure 6E:
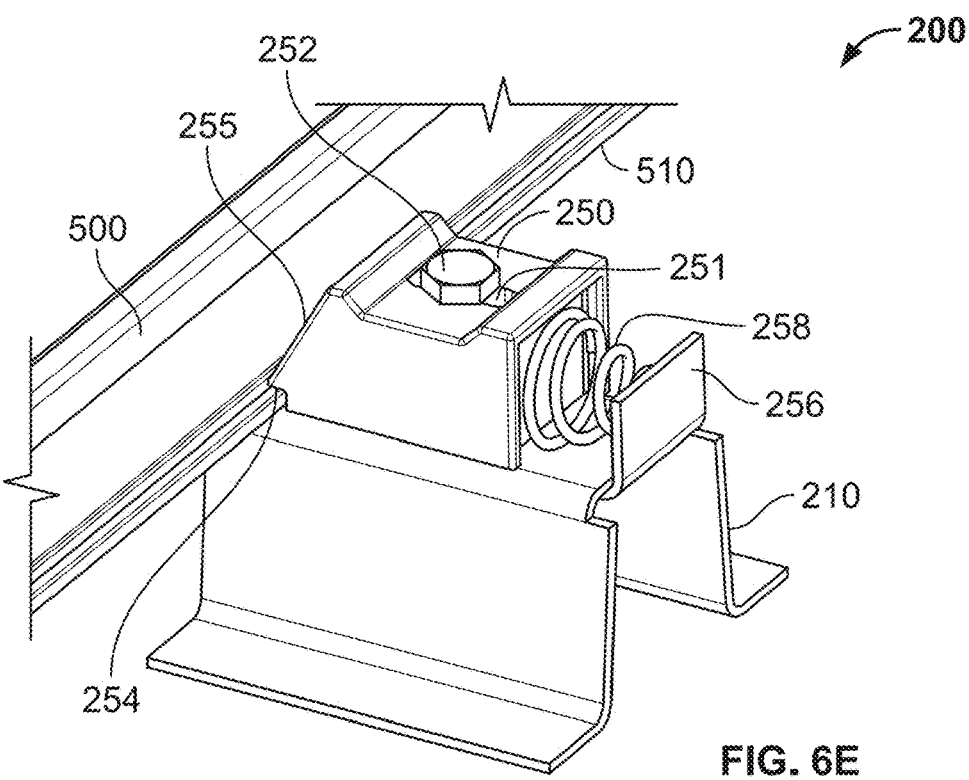
FIG. 6E illustrates a bracket assembly according to an embodiment.
Figure 6F:
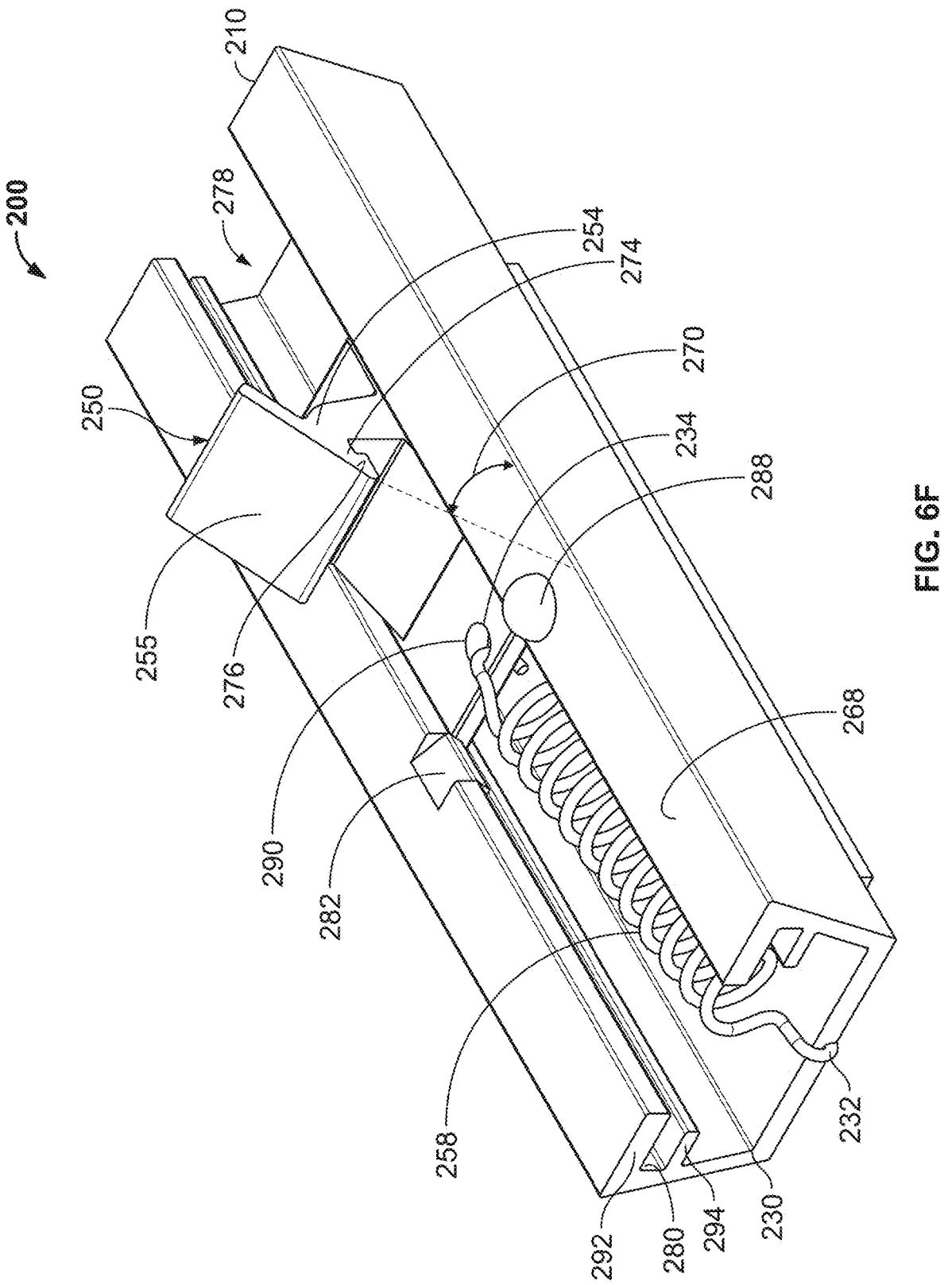
FIG. 6F illustrates a bracket assembly according to an embodiment.

FIGS. 6A-6F illustrate embodiments of clip 250. For example, FIG. 6A illustrates a clip 250 having a hook portion 254 that snaps onto an edge feature 510 of a PV module 500, according to an embodiment. In some embodiments, an installer may lift hook portion 254 up and then release hook portion 254 when the PV module 500 is in place. In some embodiments, for example as shown in FIG. 6F, hook portion 254 includes an undercut 274 and a lip 276. Lip 276 may be configured to engage edge feature 510 of PV module 500.

As shown, for example, in FIG. 6A, in some embodiments, clip 250 may have a top portion 260 and a pair of legs 262. In some embodiments, top portion 260 and legs 262 of clip 250 may be configured such that clip 250 is disposed about top portion 216 and legs 218 of bracket 210. In some embodiments, flanges 264 may extend from legs 262 of clip 250 and through respective through holes (e.g., slots) 212 in legs 218 of bracket 210 to secure clip 250 to bracket 210.

FIG. 6B illustrates a clip 250 that functions as a torsion clip, according to an embodiment, which rotates about an axis extending through fastener 252. In some embodiments, fastener 252 may secure clip 250 to bracket 210, while permitting rotation of clip 250. In some embodiments, clip 250 may rotate from a first position, toward backstop 256 to a second position, in response to being displaced by a PV module 500. Because clip 250 may be biased toward the first position, for example as described above, when PV module 500 is placed onto bracket 210, clip 250 may rotate back to the first position. As shown, for example, in FIG. 6B, hook portion 254 of clip 250 may interface with an edge feature 510 of PV module 500 to secure PV module 500 in place.

In FIG. 6C, clip 250 is a wire form clip, according to an embodiment. Similar to the embodiment shown in FIG. 5B, clip 250 shown in FIG. 6C may be displaced linearly by a PV module, from a first position to a second position. In some embodiments, clip 250 may be returned to the first position by biasing members 258. In some embodiments, biasing members 258 may be coupled to bracket 210 at through holes 212, which may be located in the legs 218 of bracket 210, for example as shown in FIG. 6C. In some embodiments, biasing members 258 may bias clip 250 to the first position. For example, during installation, PV module 500 may displace clip 250, causing biasing members 258 to move outwardly to allow clip 250 to be displaced to the second position. Once PV module 500 is lowered onto bracket 210, biasing members 258 may push clip 250 back to the first position. Angled portion 255 of clip 250 may interface with an edge feature 510 of PV module 500 to secure PV module 500 in place.

In FIG. 6D, clip 250 is a spring clip, according to an embodiment, which may function similarly to the embodiment shown in FIG. 4B. As shown in FIG. 6D, for example, clip 250 may be secured to bracket 210, for example, with fasteners extending through a pair of through holes 222 in feet 220 of bracket 210. In some embodiments, for example as shown in FIGS. 6D, 6E, and 6F, during installation, PV module 500 may slide down a sloped upper portion 255 of clip 250. PV module 500 may displace clip 250 backwards. In some embodiments, when PV module 500 makes contact with an apex 257 between sloped upper portion 255 and hook portion 254 of clip 250, hook portion 254 may snap over an edge feature 510 of PV module 500 to secure PV module 500 in place. In some embodiments, sloped upper portion 255 may be disposed at an angle 270 within a range of from approximately 30° to approximately 60° with respect to an upper surface of bracket 210. In some embodiments, angle 270 is approximately 45°.

In FIG. 6E, clip 250 is a sliding snap, according to an embodiment, which may be fastened to bracket 210, for example, with a fastener 252. In some embodiments, fastener 252 may be a bolt disposed in a slot 251 of clip 250. Fastener 252 may secure clip 250 to bracket 210, while allowing translational movement of the clip 250 along bracket 210. For example, during installation, clip 250 may be displaced by a PV module 500 from a first position, along slot 251, into biasing member 258 (e.g., a spring). When the PV module 500 is lowered onto bracket 210, biasing member 258 may displace clip 250 back to the first position, allowing hook portion 254 to interface with edge feature 510 of PV module 500.

Figure 15:
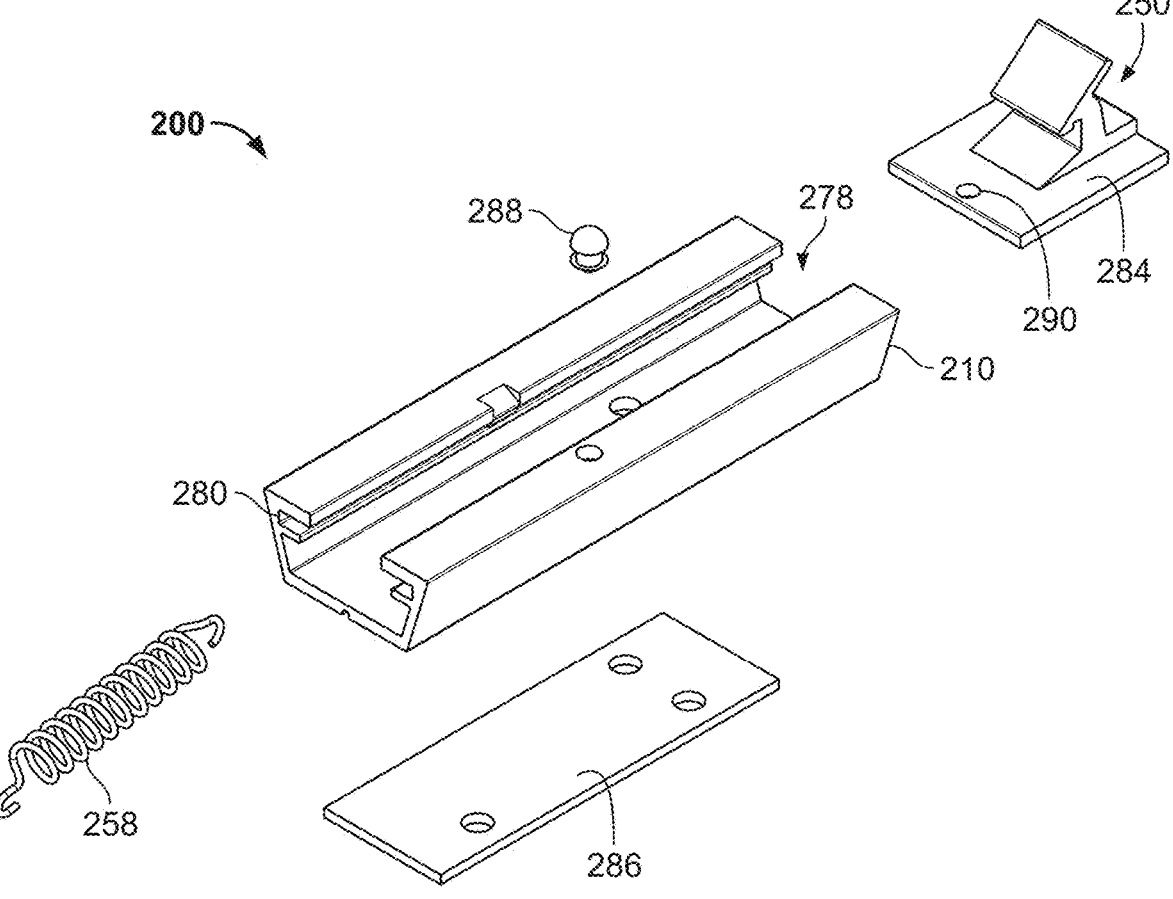
FIG. 15 is an exploded view of the bracket assembly of FIG. 6F.

In FIG. 6F, clip 250 is a sliding clip, according to an embodiment. As shown in FIG. 6F, in some embodiments, clip 250 may be disposed within a channel 278 of bracket 210. As shown in FIG. 15, for example, clip 250 may be coupled to a clip base 284, which may be configured to slide into a recess 280 within channel 278. In some embodiments, recess 280 is defined by a first raised portion 292 of a top portion of bracket 210 and a second raised portion 294 of bracket 210. Because clip base 284 may fit snugly within recess 280, fasteners may not be necessary to secure clip 250 to bracket 210. However, in some embodiments, bracket assembly 200 includes a slider flange 282 configured to secure clip base 284 within bracket 210.

In some embodiments, clip 250 may be biased toward a first position by biasing member 258, for example a spring. As shown in FIG. 6F, for example, biasing member 258 may be disposed within channel 278, adjacent to clip 250. In some embodiments, a first end 232 of biasing member 258 may be coupled to an edge 230 of bracket 210. Biasing member 258 may also be coupled to clip 250. For example, a second end 234 of biasing member 258 may be coupled through an aperture 290 extending through clip base 284. During installation of a PV module, for example, clip 250 may be displaced by the PV module from a first position, along recess 280, to a second position, thereby extending biasing member 258. When the PV module is lowered onto a top surface of bracket 210, biasing member 258 may contract, pulling on clip base 284 to move clip 250 from the second position toward the first position such that a hooked portion 272 of clip 250 may engage with an edge feature of the PV module to secure the PV module in place. In some embodiments, a bumper 288 is disposed on a top surface of bracket 210. Bumper 288 may provide a cushion between the PV module and the top surface 268 of bracket 210.

As described above, bracket assemblies 200 may be installed on a roofing panel 300. Roofing panel may be, for example, metal, plastic, or a composite material. In some embodiments, roofing panel 300 may be fastened directly to roof decking. Roofing panel 300 may be installed on both new roofs and existing roofs.

Referring, for example, to FIGS. 10-12B, in some embodiments, roofing panel 300 may include a base layer 320 and a plurality of ribs 310 extending upwardly from base layer 320. In some embodiments, ribs 310 are integral with base layer 320. In some embodiments, bracket assemblies 200 may be installed on every other rib 310. In some embodiments, bracket assemblies 200 may be installed on every rib 310. In some embodiments, bracket assemblies 200 may be installed on every third rib. In some embodiments, the contact between bracket assemblies 200 and ribs 310 provides grounding for the PV modules. In some embodiments, grounding between components, for example between bracket assemblies 200 and ribs 310, is not included. For example, in some embodiments, bracket assemblies 200 may be non-conductive. Or, in some embodiments, an external ground source may be coupled to roofing panel 300.

In some embodiments, ribs 310 may be aligned in a row, and the distance between each rib 310 may be one third of a width of the PV modules 500. This spacing may allow for PV modules 500 having different widths to be installed on the same roofing panel because there is a surplus of ribs on the roofing panel. For example, in some embodiments, PV module 500 may have a width in the range of 30 inches to 45 inches. In some embodiments, PV module 500 may have a width of approximately 34 inches. In some embodiments, PV module 500 may have a width of approximately 39.6 inches. In some embodiments, only two ribs are used to secure a first PV module, one on either end of the module; however, the PV module may extend over additional ribs that are not used to secure the PV module. Accordingly, in some embodiments, a second PV module having a smaller width may be installed adjacent to the first PV module, over the additional ribs not used to secure the first PV module.

The additional ribs may also be used to install PV modules in custom patterns for aesthetic purpose, or, for example, to maximum exposure to the sun. For example, as shown in FIG. 2, PV module A may be secured to ribs 310A, PV module B may be secured to ribs 310B, and PV module C, may be secured to ribs 310C. PV modules A and B may extend over ribs 310C; however, in some embodiments, ribs 310C may not be used to secure PV modules A and B. Accordingly, PV module C may be installed adjacent to, but not aligned with, PV modules A and B, thereby creating a custom pattern.

Figures 20A, 20B, 20C:
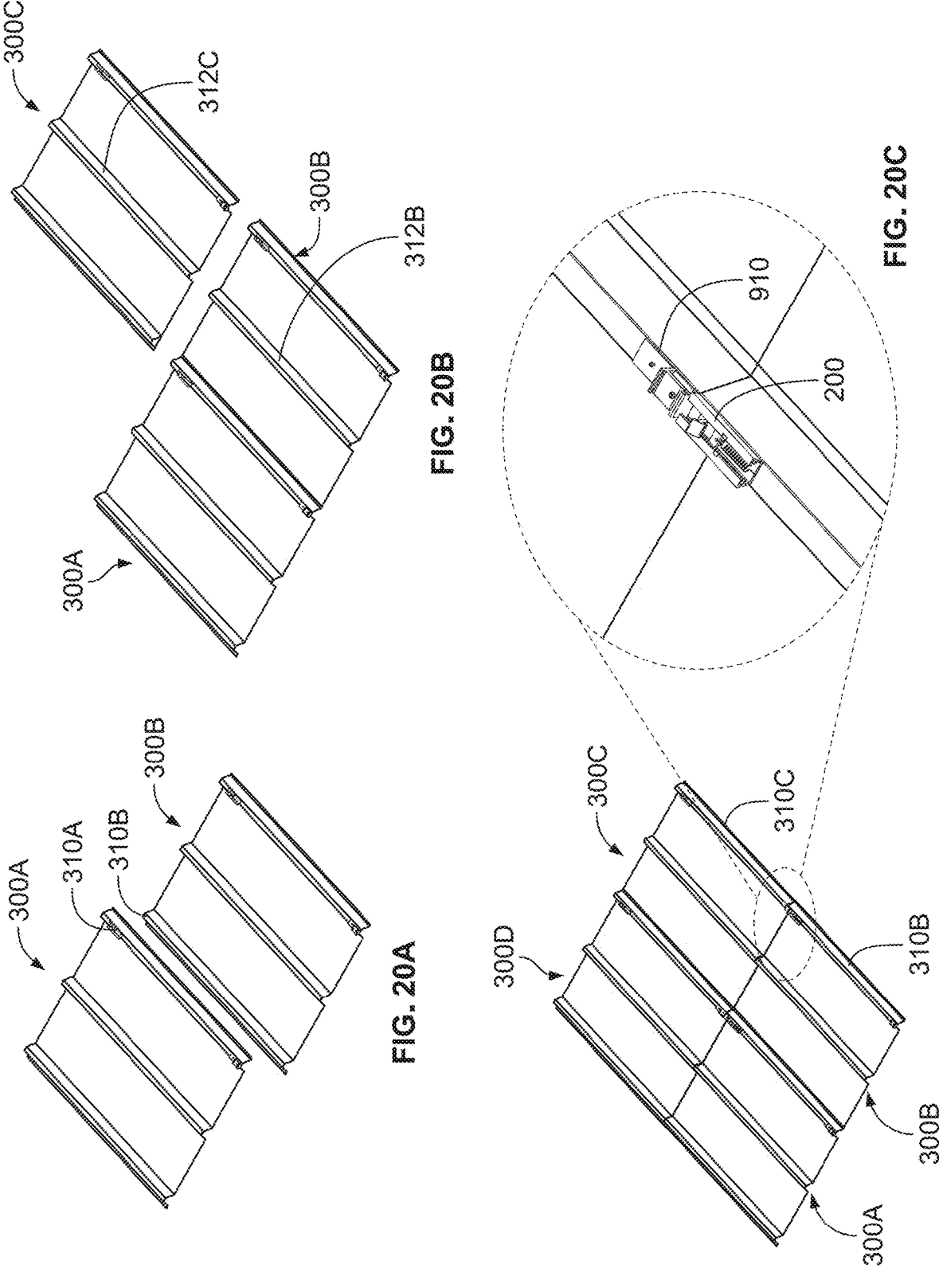
FIG. 20A illustrates a step in an installation process of a roofing panel according to an embodiment.
FIG. 20B illustrates a step in an installation process of a roofing panel according to an embodiment.
FIG. 20C illustrates a step in an installation process of a roofing panel according to an embodiment.

In some embodiments, for example as shown in FIGS. 20A-20C, multiple roofing panels 300 are arranged into an array. As shown in FIG. 20A, for example, at least one rib 310A of a first roofing panel 300A may be positioned over a rib 310B of a second roofing panel 300B, thereby connecting first roofing panel 300A and second roofing panel 300B. Portions of ribs of additional roofing panels, for example roofing panels 300C and 300D, shown in FIGS. 20B and 20C, may be positioned over the ribs of the first and second roofing panels 300A and 300B to create any desired pattern (e.g., square, rectangle, or other symmetrical or asymmetrical polygon). For example, as also shown in FIGS. 20B and 20C, in some embodiments, at least a portion 312C of rib 310C of a roofing panel 300C overlaps at least a portion 312B of a rib 310B of an adjacent roofing panel 300B. Roofing panels 300 may be further attached to one another, for example with fasteners (e.g., screws, bolts, etc.). Fasteners may be located at the ribs 310 or the base portions 320. In some embodiments, for example as shown in FIG. 20C, a bracket assembly 200 disposed on a first rib 310B abuts a stationary bracket assembly 910 disposed on a second rib 310C. The positioning of the bracket assembly 200 and the stationary bracket assembly 910 may allow PV modules to be installed adjacent to each other without significant gaps between them. This array arrangement helps to quickly locate and assemble the roof panels 300, for an overall faster installation.

Furthermore, because the ribs are already aligned on the roofing panel, precise measurement to determine exact installation locations of the PV modules is not required, saving time during the installation process.

In some embodiments, flashing may be installed as part of PV mounting system 100 to prevent water from leaking through the roof. In some embodiments, the flashing may be made from a metal, for example steel or aluminum. In some embodiments, the flashing may be made from flexible flashing materials, for example, plastic or rubber materials.

Figures 8A, 8B, 9:
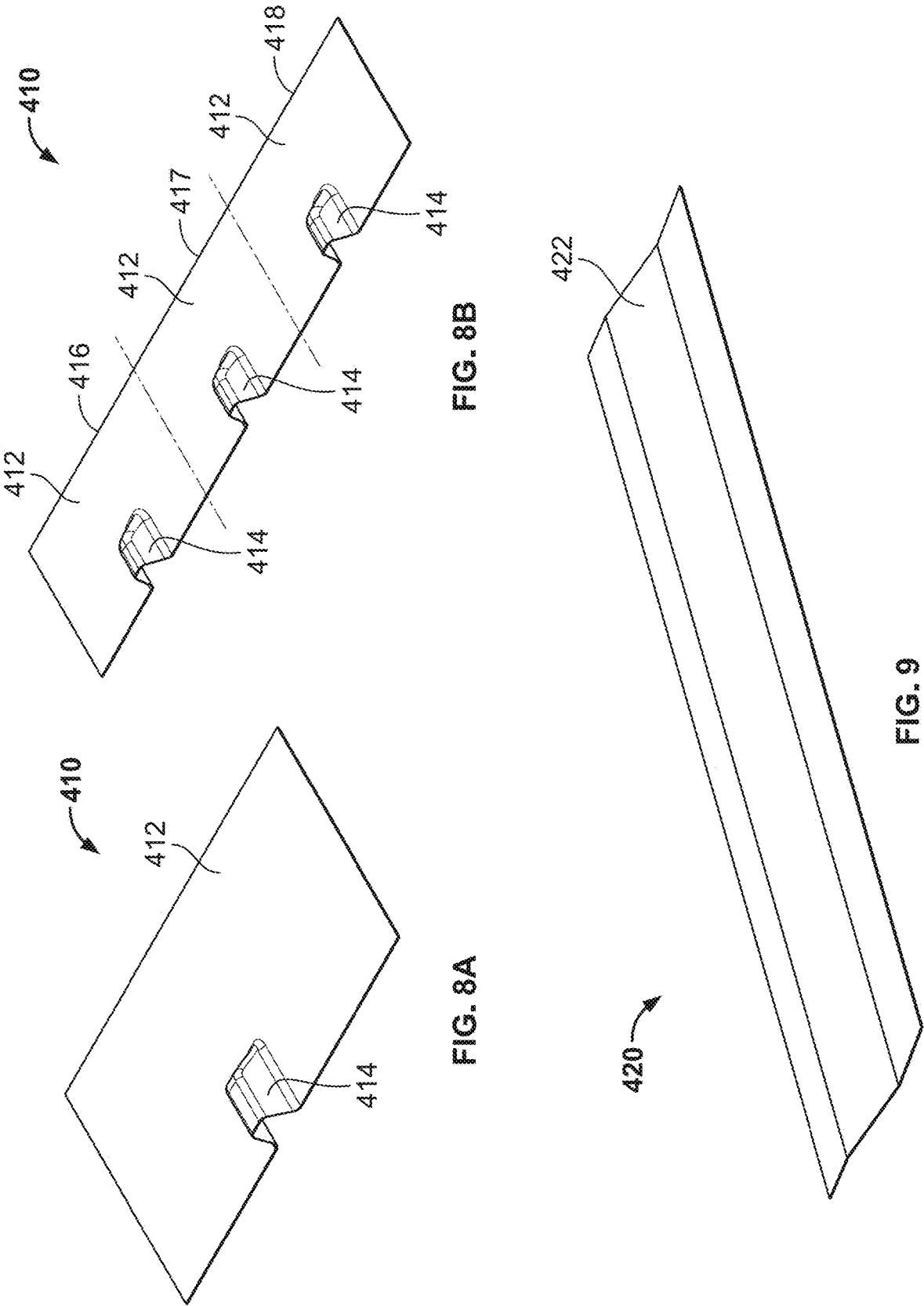
FIG. 8A illustrates a top flashing panel according to an embodiment.
FIG. 8B illustrates a top flashing panel according to an embodiment.
FIG. 9 illustrates a bottom flashing panel according to an embodiment.
Figure 12A:
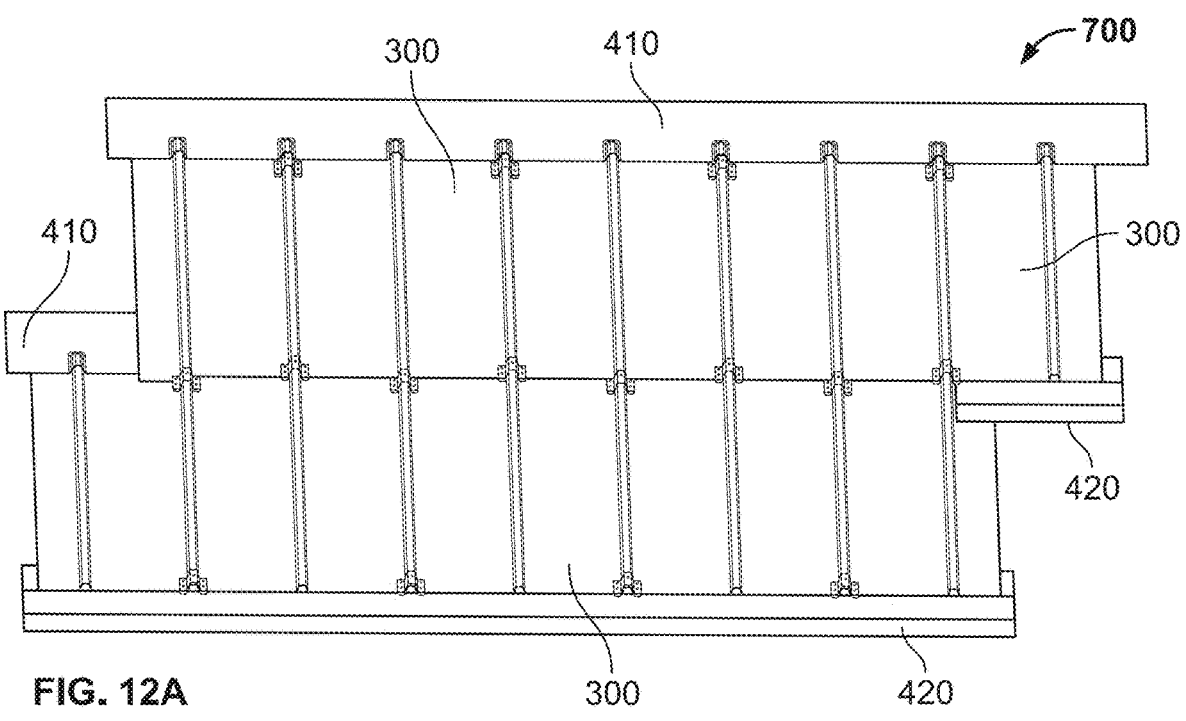
FIG. 12A illustrates a roofing panel and flashing assembly according to an embodiment.
Figure 12B:
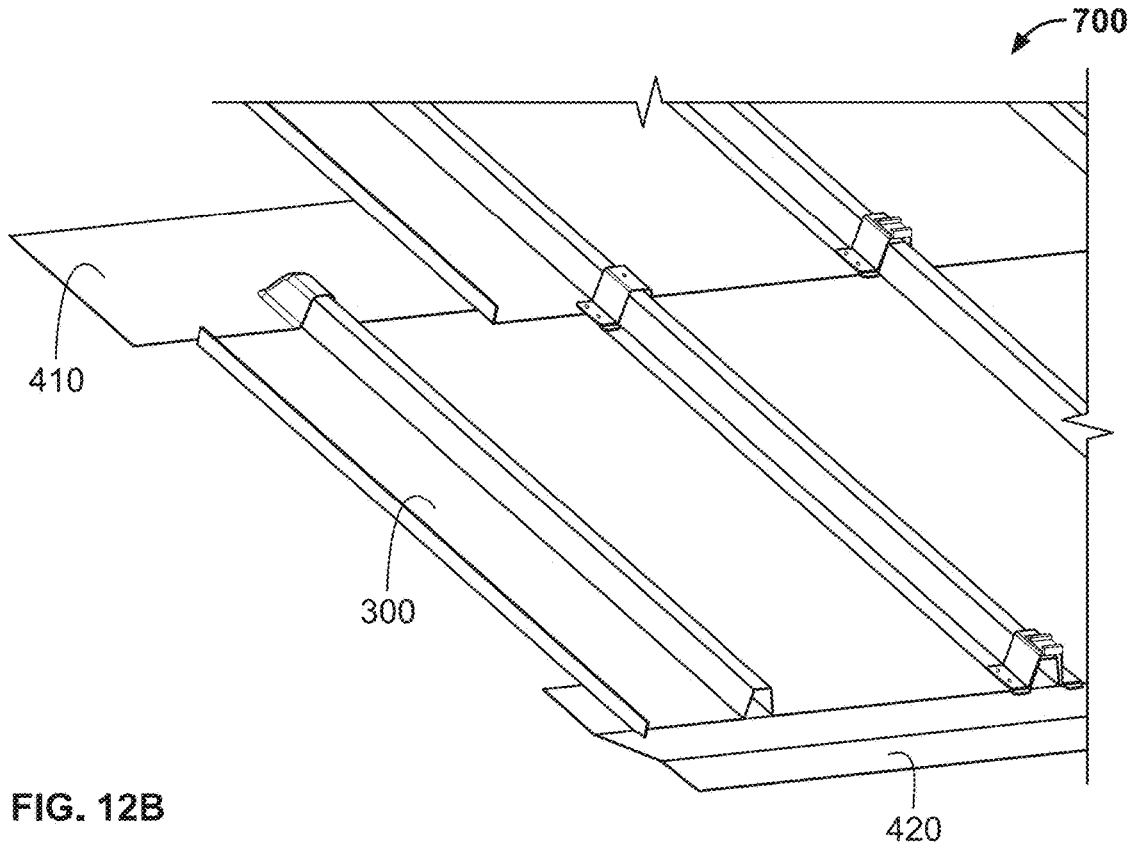
FIG. 12B illustrates a portion of the roofing panel and flashing assembly of FIG. 12A according to an embodiment.
Figure 13:
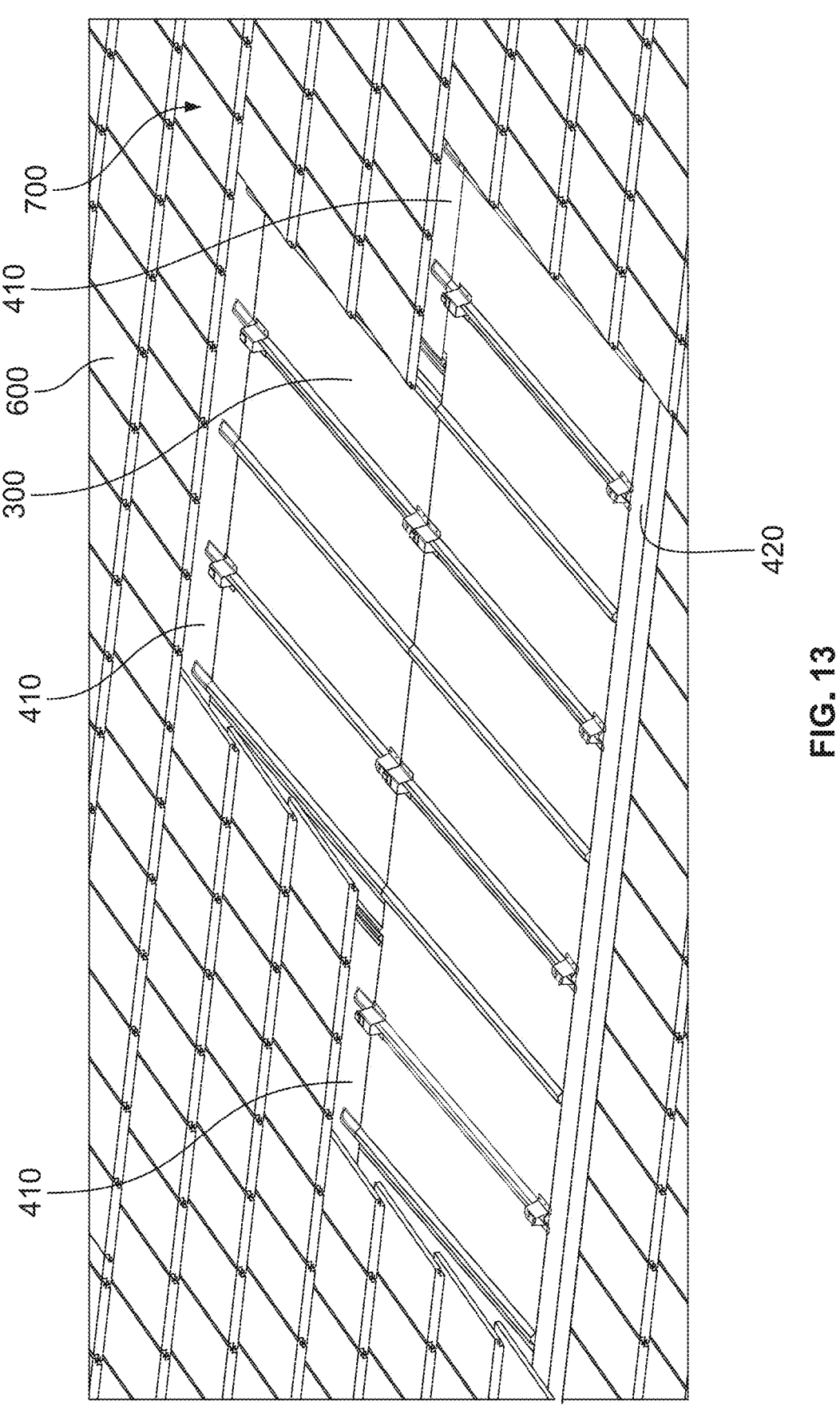
FIG. 13 illustrates a roofing panel and flashing assembly attached to a roof according to an embodiment.

In some embodiments, a head flashing 410, as shown for example in FIG. 8A, may be installed along a top edge of a roofing panel 300, as shown, for example, in FIGS. 12A, 12B, and 13. In some embodiments, head flashing 410 may include a base layer 412 and a raised portion 414. In some embodiments, raised portion 414 may be dimensioned to cover ribs 310. In some embodiments, head flashing 410 may be coupled with roofing panel 300 to form a roofing panel and flashing assembly 700. In some embodiments, for example as shown in FIG. 8B, head flashing 410 includes a first head flashing portion 416, a second head flashing portion 417, and a third head flashing portion 418. First head flashing portion 416, second head flashing portion 417, and third head flashing portion 418 may be configured to be separated from each other (e.g. by cutting, scoring, etc.) in order to facilitate customization of the PV mounting system during installation. Each heading portion may have a raised portion 414 to cover a corresponding rib. For example, there may be one, two, three, four, or more raised portions. In some embodiments, flashing 410 includes three raised portions 414, as shown in FIG. 8B.

In some embodiments, a toe flashing 420, as shown for example in FIG. 9, may be installed along a bottom edge of roofing panel 300. In some embodiments, toe flashing 420 may also be integrated with roofing panel 300. In some embodiments, toe flashing 420 may have a stepped or curved profile to facilitate water runoff away from the roofing panel 300.

Figure 10:
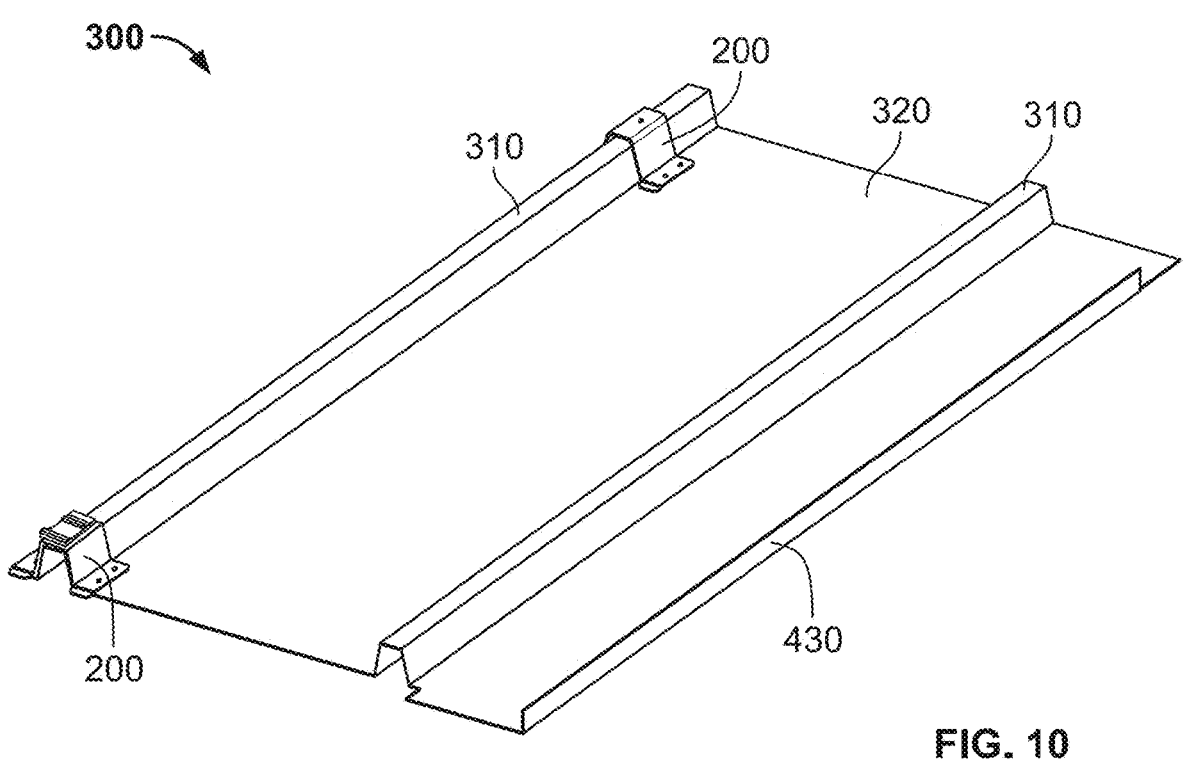
FIG. 10 illustrates a roofing panel with flashing according to an embodiment.
Figure 11:
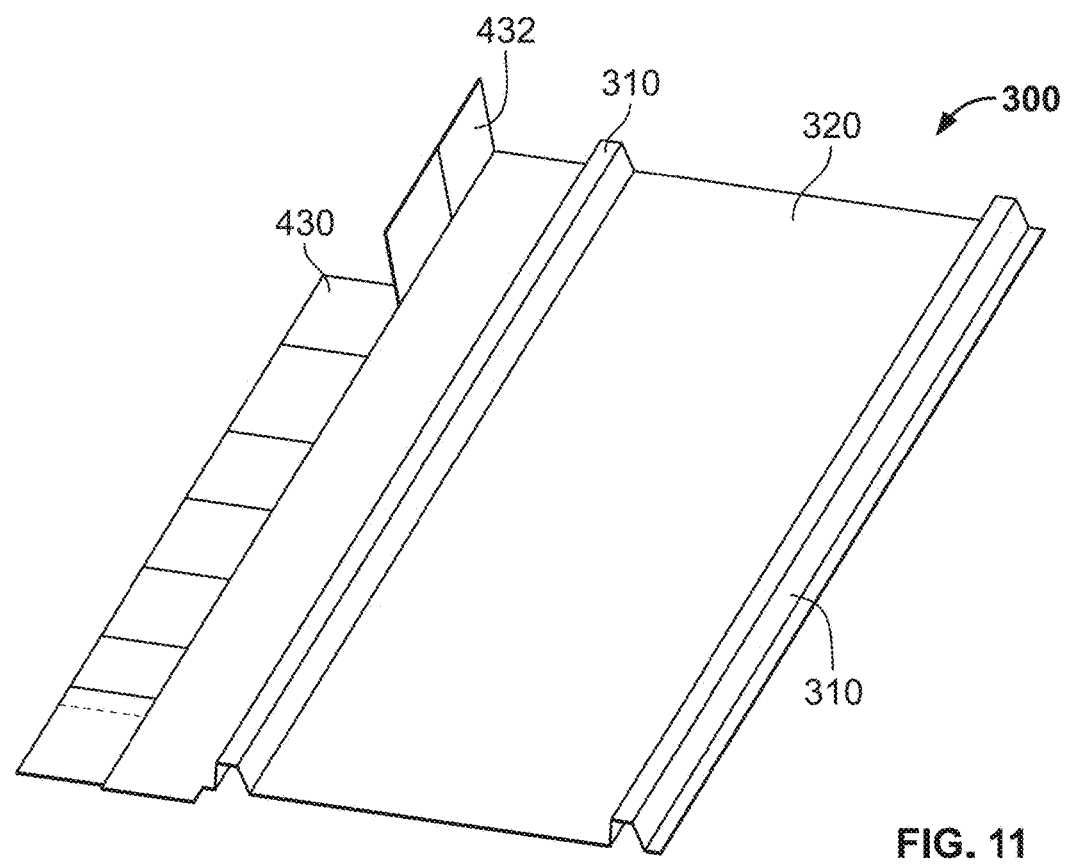
FIG. 11 illustrates a roofing panel with flashing according to an embodiment.

In some embodiments a side flashing 430, as shown for example in FIG. 10, may be coupled to a side edge of roofing panel 300. In some embodiments, for example as shown in FIG. 11, side flashing 430 may be flexible so that it may be bent to extend upward from (e.g., perpendicular to) base layer 320. The flexibility of side flashing 430 allows, for example, for integration with previously installed roofing materials. For example, the bent portion 432 of side flashing 430 may abut a side portion of, or hook into, a roofing material, for example a shingle or a tile such as roofing 600. In some embodiments, bent portion 432 may have a height of at least approximately one inch and may be spaced at least approximately six inches away from the closest adjacent rib.

Figure 18:
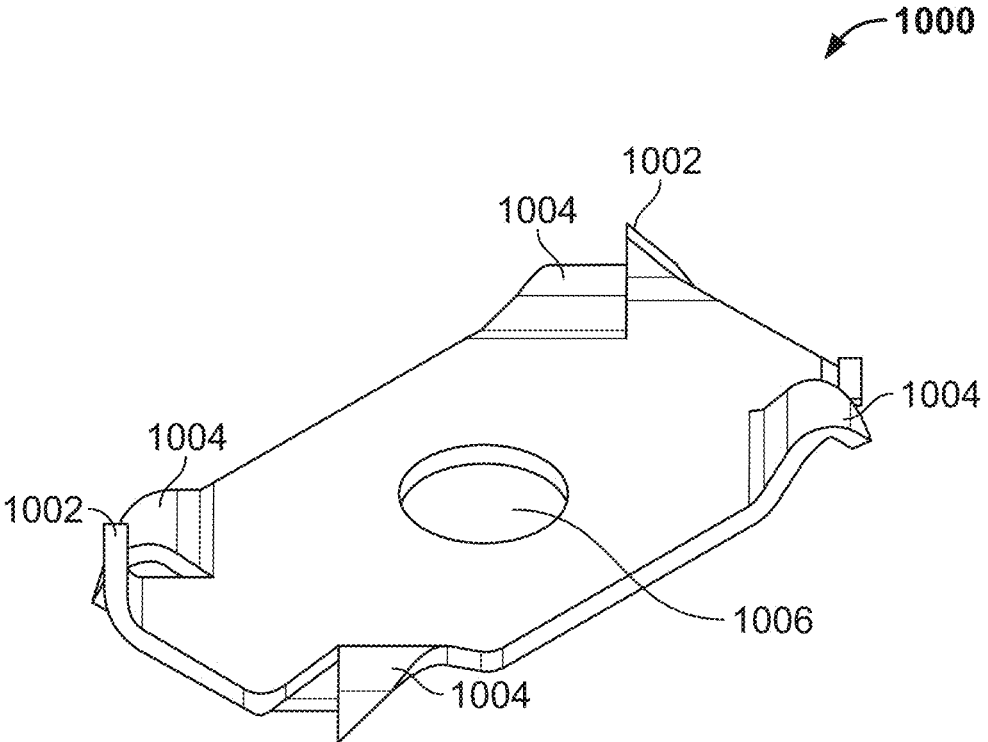
FIG. 18 illustrates a grounding washer according to an embodiment.
Figure 19B:
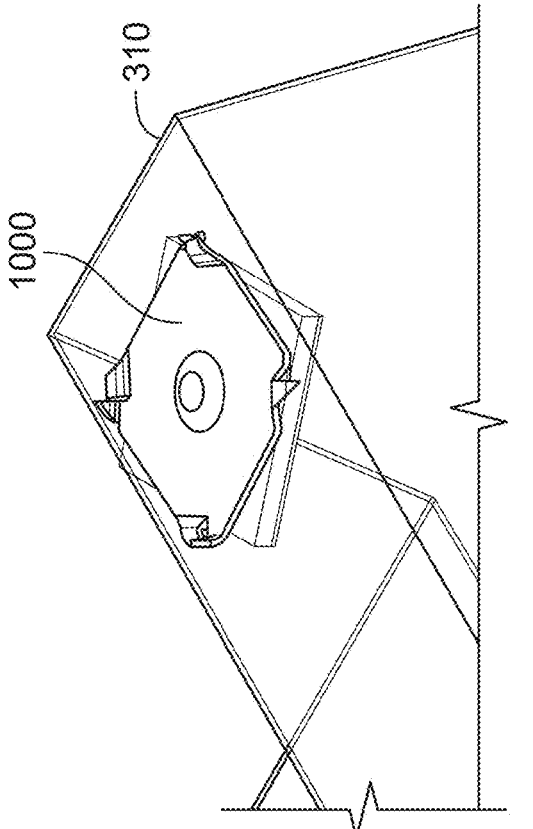
FIG. 19B illustrates a top perspective view of a grounding washer according to an embodiment.
Figure 19A:
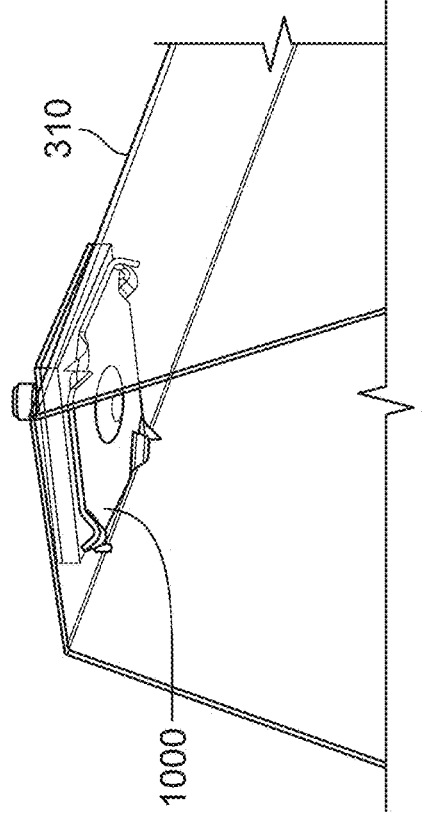
FIG. 19A illustrates a side perspective view of a grounding washer according to an embodiment.

In some embodiments, for example as shown in FIGS. 18, 19A, and 19B, PV mounting system 100 includes grounding elements facilitate forming an electrical grounding path between the system components. For example, the PC mounting system may include at least one grounding washer 1000 disposed on a bottom surface of a rib 310. Grounding washer 1000 may include a plurality of grounding features or teeth, (e.g., upper contacting spikes 1002) configured to contact the bottom surface of rib 310, and a plurality of lower contacting spikes 1004 configured to provide a grounding path (e.g., to contact another rib) between a roofing panel 300 and adjacent roofing panels 300 when the roofing panels are arranged to form an array. In some embodiments, when a PV module is positioned on top of a rib 310, grounding washer 1000 may form a grounding path between the PV module and the roof.

Various types and shapes of grounding features (e.g. teeth, spikes, serrations, etc.) can be implemented to ensure a secure mechanical and electrical connection in all field conditions and, for example, to exclude moisture from a grounding bond area by creating a high pressure connection zone around each grounding point or line. Grounding features can include surface-disrupting and/or surface-penetrating elements which may be suitable for example in cases where the roofing panels, ribs or module frames have non-conductive outer surfaces, such as a painted outer surface, so as to create a secure electrical connection between system components.

Figures 21A, 21B, 21C:
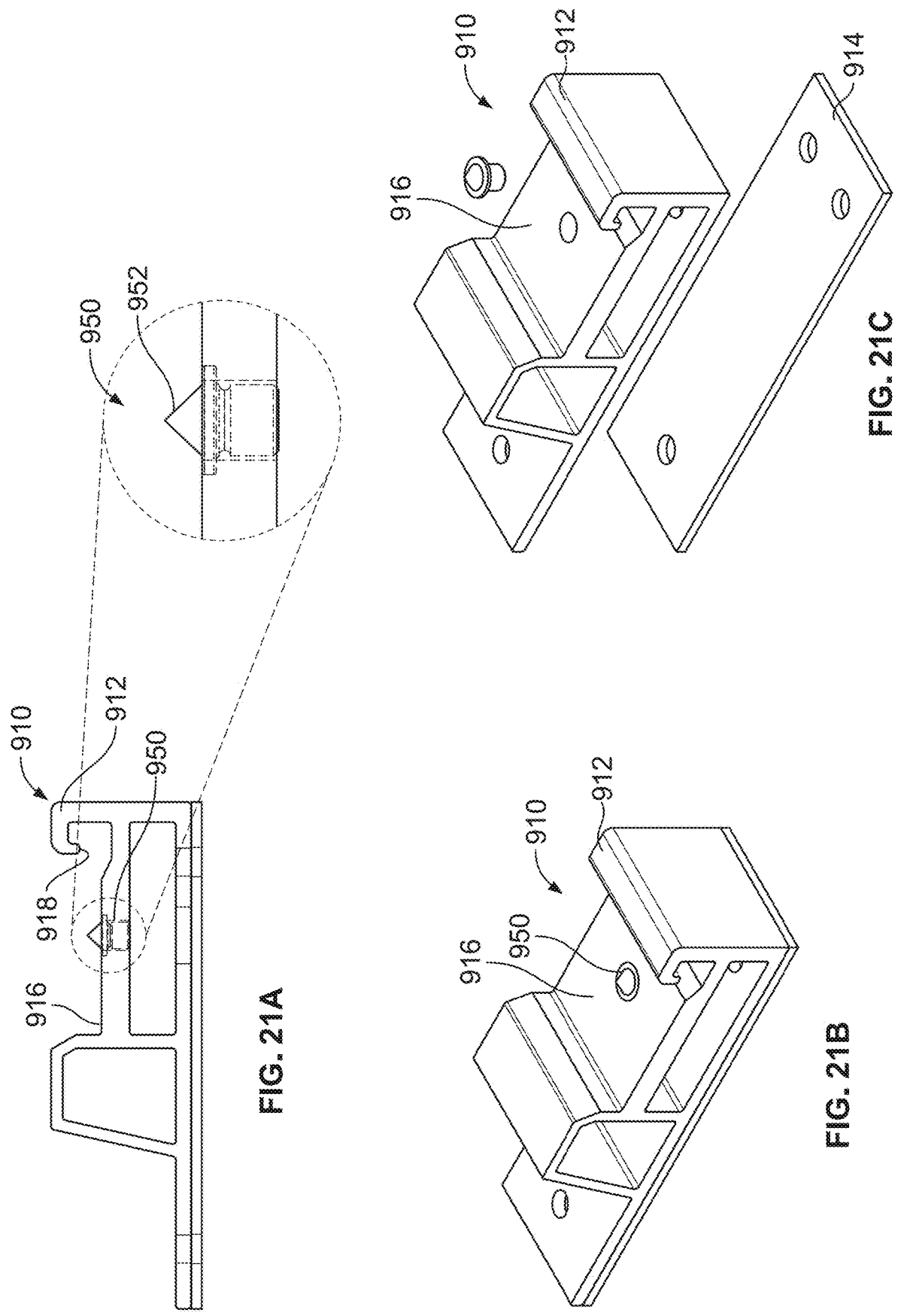
FIG. 21A illustrates a side view of a stationary bracket assembly according to an embodiment.
FIG. 21B illustrates a top perspective view of the stationary bracket assembly of FIG. 21A.
FIG. 21C illustrates an exploded view of the stationary bracket assembly of FIG. 21A.
Figure 22A:
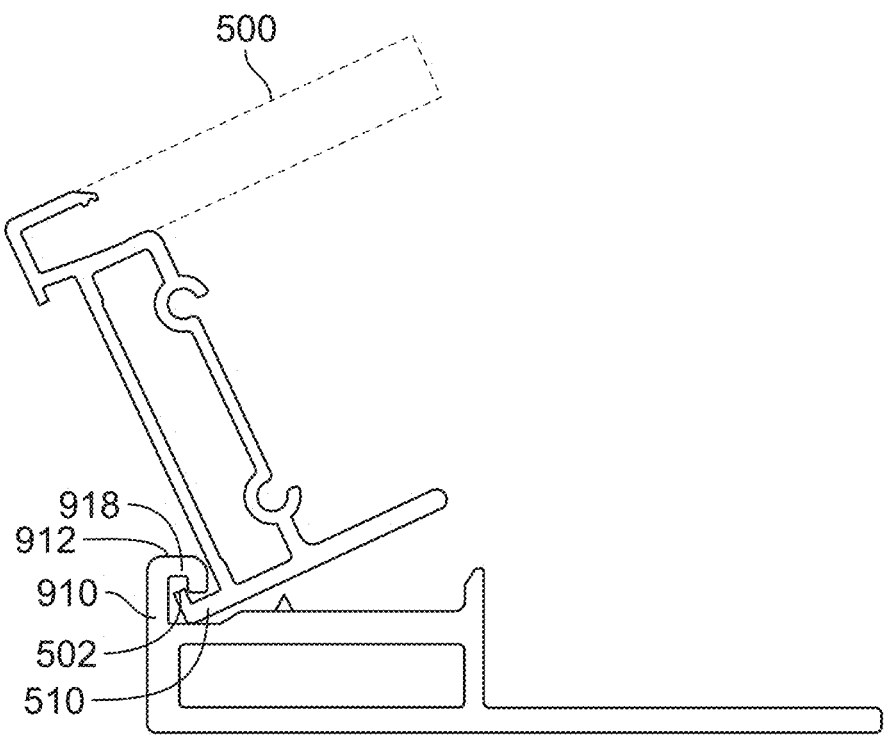
FIG. 22A illustrates a step in an installation process of a roofing panel according to an embodiment.
Figure 22B:
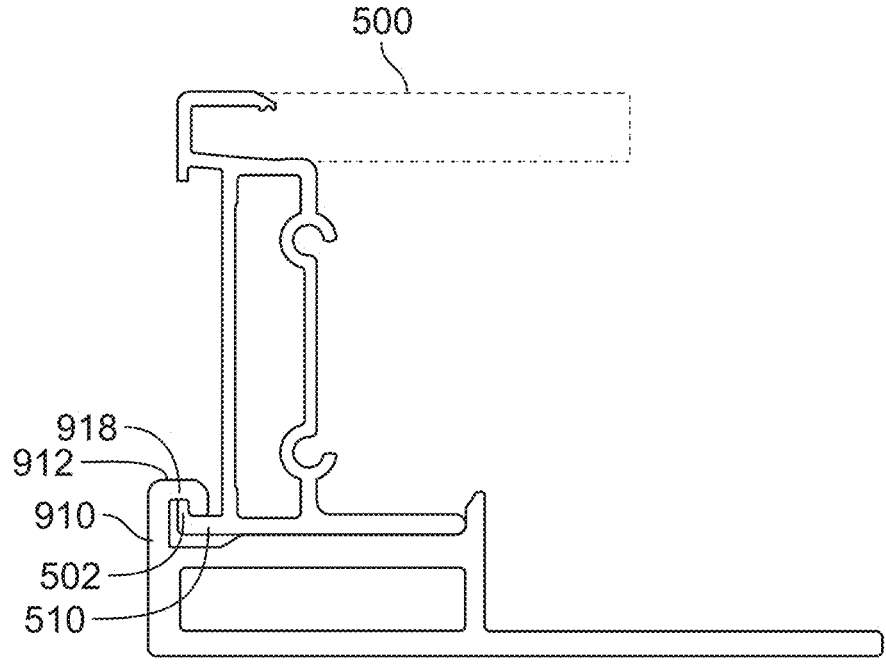
FIG. 22B illustrates a step in an installation process of a roofing panel according to an embodiment.

In some embodiments, grounding washer 1000 is disposed below a stationary bracket assembly 910 (see FIGS. 21A-21C) coupled to a top surface of a rib 310. As described below, stationary bracket assemblies 910 may be used to secure a first edge 502 of a PV module during installation of the PV module to a roofing panel. In some embodiments, stationary bracket assembly 910 includes a stationary clip 912 including a hooked portion 918 configured to engage with an edge of a PV module. Stationary bracket assembly 910 may also include a grounding component 950 having an upper portion 952 which extends above a top surface 916 of stationary bracket assembly 910. In some embodiments, grounding component 950 may be a pin, for example, a pin having a conical upper portion 952. In some embodiments, for example as shown in FIGS. 22A and 22B, when a PV module 500 is installed, the upper portion 952 of grounding component 950 may contact the PV module to form a grounding path between the PV module and stationary bracket assembly 910. In some embodiments, stationary bracket assembly 910 includes a base 914 disposed between the top surface of rib 310 and a bottom surface of clip 912. Base 914 may provide a seal between rib 310 and clip 912.

FIGS. 14A-14E and 32 illustrate a process for installing PV modules according to embodiments. For example, as shown in step 900A in FIG. 14A (for example, step 1102 in FIG. 32), one or more stationary brackets 910 may be connected to an edge feature 510 of PV module 500 on a first end 502 of the PV module 500. In some embodiments, stationary brackets 910 may secure the first end 502 of the PV module 500 to ribs 310 on roofing panel 300, for example, via a bracket. In some embodiments, stationary brackets 910 may be replaced with any of the clips 250 described herein. As illustrated in step 900B (for example, step 1104 in FIG. 32), shown in FIG. 14B, PV module 500 may then be lowered, or rotated, toward the roof from position A to position B, from position B to position C, and from position C down onto a bracket assembly 200, connected to roofing panel 300 via ribs 310 (for example, step 1106 in FIG. 32). The bracket and/or clip features can enable quick locating and assembly of the roof panels 300 for an overall faster installation, for example via rotating or pivoting a PV module 500 about a first bracket, for example stationary bracket 910, and engaging an edge of the PV module 500 via one or more clips, for example clips 250 on brackets 210.

In some embodiments, for example as shown in FIGS. 22A and 22B, the edge feature 510 disposed at first end 502 may be a lip that is configured to engage with a hooked portion 918 of clip 912. Lip 510 may hook onto hooked portion 918 of clip 912 to provide stability during installation.

Figure 14C:
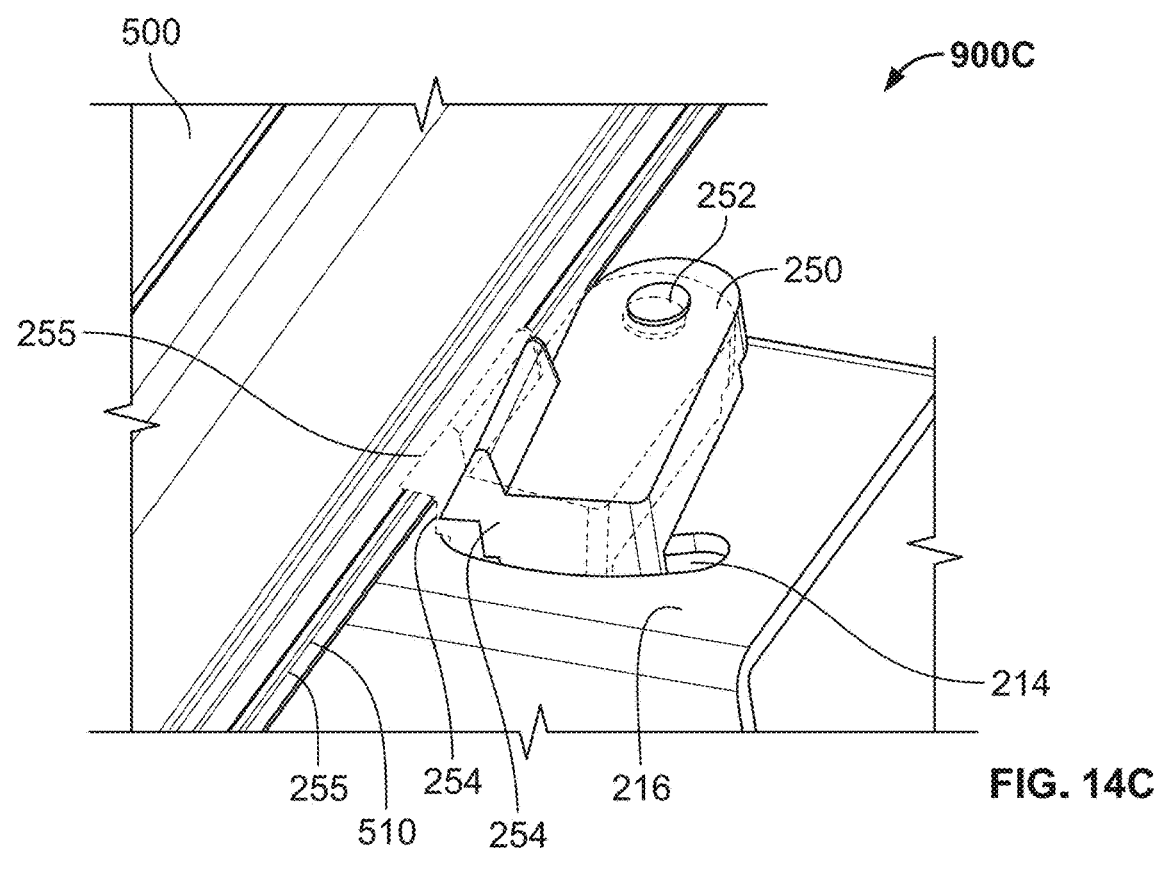
FIG. 14C illustrates a step in an installation process of a photovoltaic module according to an embodiment.
Figure 14D:
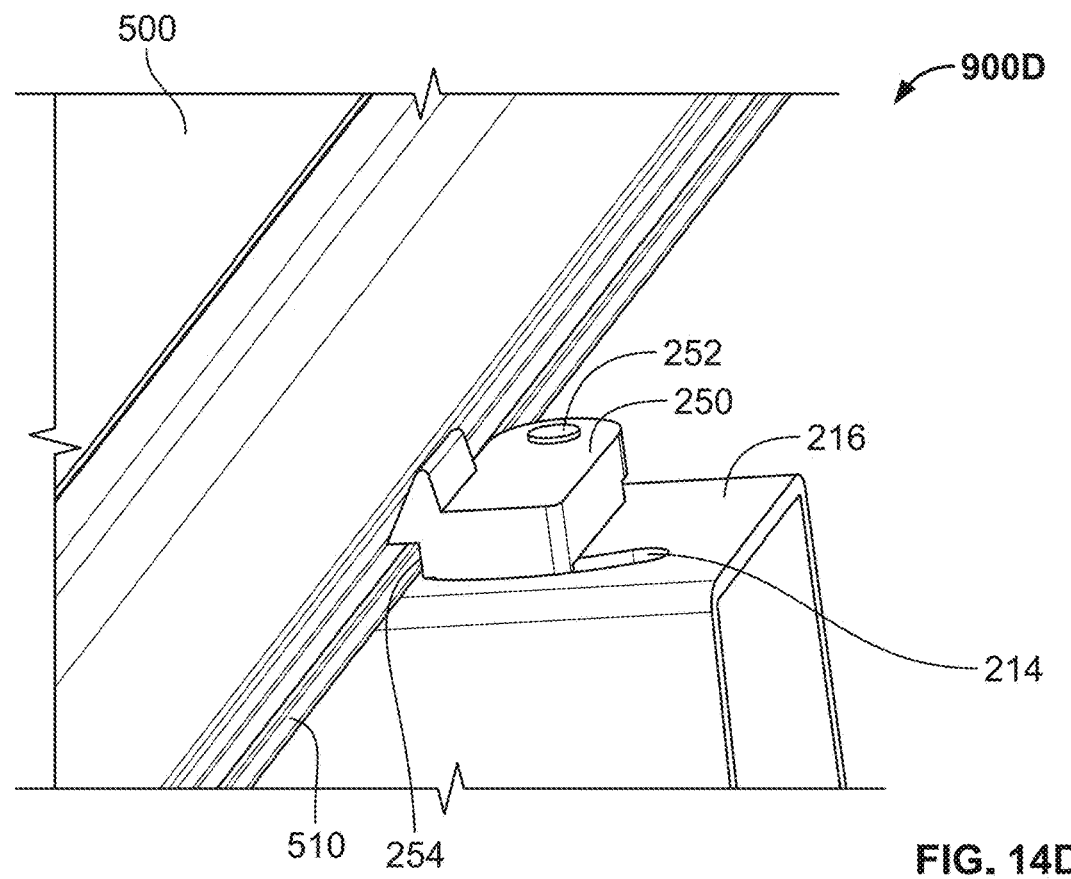
FIG. 14D illustrates a step in an installation process of a photovoltaic module according to an embodiment.

In some embodiments, as PV module 500 is lowered, as demonstrated for example in step 900C, shown in FIGS. 14C and 14D, PV module 500 may slide down angled portion 255 of clip 250, displacing clip 250 so that it moves (e.g., by translating or rotating) from a first position (A) to a second position (B) (for example, step 1108 in FIG. 32). It should be noted that any of the clips 250 described herein may be used. In some embodiments, clip 250 is biased to the first position (A), such that when PV module 500 is lowered onto top surface 216 of bracket 210, as shown for example in step 900D (and, for example, step 1110 in FIG. 32), clip 250 returns from the second position (B) toward or to the first position (A) (for example, step 1112 in FIG. 32). In some embodiments, when clip 250 returns to the first position (A), a hook portion 254 interfaces with an edge feature 510 of PV module 500, thereby securing PV module 500 to roofing panel 300. No additional fasteners are required to secure PV module 500, which significantly decreases installation time, resulting in reduced cost.

Figures 23A, 23B, 23C:
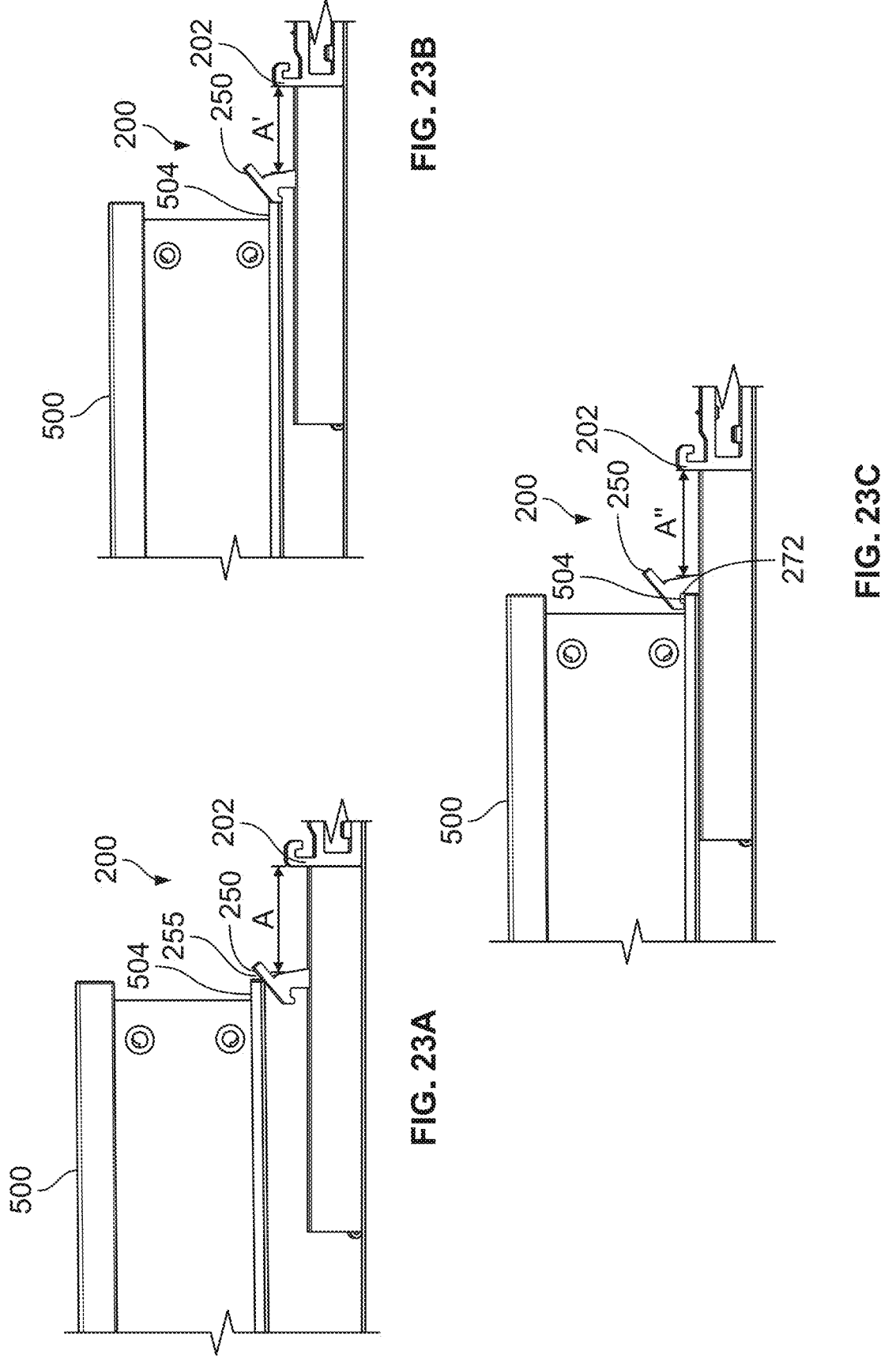
FIG. 23A illustrates a step in an installation process of a roofing panel according to an embodiment.
FIG. 23B illustrates a step in an installation process of a roofing panel according to an embodiment.
FIG. 23C illustrates a step in an installation process of a roofing panel according to an embodiment.

The installation process of PV module 500 is similarly shown in FIGS. 23A-23C. For example, in some embodiments, a first position (see FIG. 23A) of clip 250 may be defined by a distance (A) between clip 250 and an edge 202 of the bracket assembly 200. When clip 250 is displaced by PV module 500, for example when an edge 504 of PV module 500 presses against angled portion 255 of clip 205, it may move to a second position (see FIG. 23B) defined by a distance (A') between clip 250 and the edge 202 of the bracket assembly 200. Once PV module 500 slides down angled portion 255 of clip 250 (as clip 250 is pushed away), clip 250 may move to a third position (see FIG. 23C) defined by a distance (A") between clip 250 and the edge 202 of the bracket assembly 200. In some embodiments distance (A) and distance (A") are approximately equal. In some embodiments, distance (A) and distance (A") are equal. As the clip 250 returns toward the first position, for example as a result of a biasing force (e.g., from spring 258), the lip 276 and/or undercut 274 of the hook portion 254 may engage the edge 504 of the PV module 500.

Figure 14E:
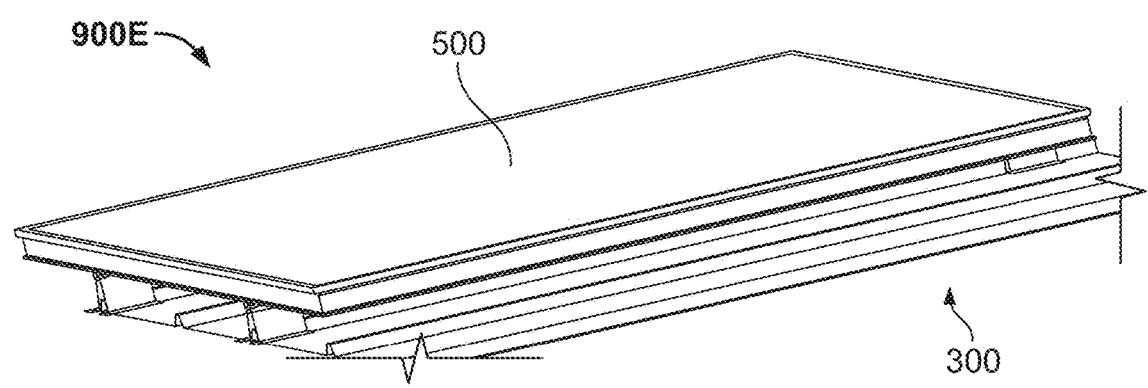
FIG. 14E illustrates a step in an installation process of a photovoltaic module according to an embodiment.

As illustrated in installation step 900E, shown for example in FIG. 14E, PV module 500 is secured to roofing panel 300 and rests on brackets 210. The height of brackets 210 is small enough to maintain a low profile of the PV modules 500. For example, in some embodiments, the height of brackets 210 may be in the range of from approximately 1 inch to approximately 4 inches. In some embodiments, the height of brackets 210 may be from approximately 2 inches to approximately 3 inches. In some embodiments, the height of brackets 210 may be 2.6 inches. Because the PV modules 500 are not flush to roofing panel 300, water may pass underneath the PV modules 500 reducing the need for additional water management elements.

In some embodiments, PV mounting system 100 may include one or more junction boxes used, for example, to house electrical connections extending from the PV modules. In some embodiments, the electrical connections extending from the PV modules may be inserted into a junction box 800, shown for example in FIGS. 25A-25B, 26, 27A-27B, 28, 29, and 30A. Junction box 800 may be waterproof and may protect the electrical connections from rain, wind, dirt, animals, and other environmental factors which may cause damage. In some embodiments, junction box 800 may be self-flashing, meaning that it forms a seal against the surface to which it is attached in order to prevent water from leaking through the roof.

In some embodiments, junction box 800 includes a body, for example housing 810 and a lid 812 removably coupled to housing 810, for example at a top edge 815 of housing 810, which may define an opening 804 of housing 810. Housing 810 may include a plurality of walls (e.g., four walls) or sides 811 and a bottom 813. In some embodiments, housing 810 may be generally a rectangle or square shape. In some embodiments, housing 810 may have rounded corners. Bottom 813 may include one or more holes, for example conduit through hole 817 and through holes 818. In some embodiments, housing 810 and/or lid 812 may be injection molded (e.g., an injection molded polymer).

Figures 27A, 27B:
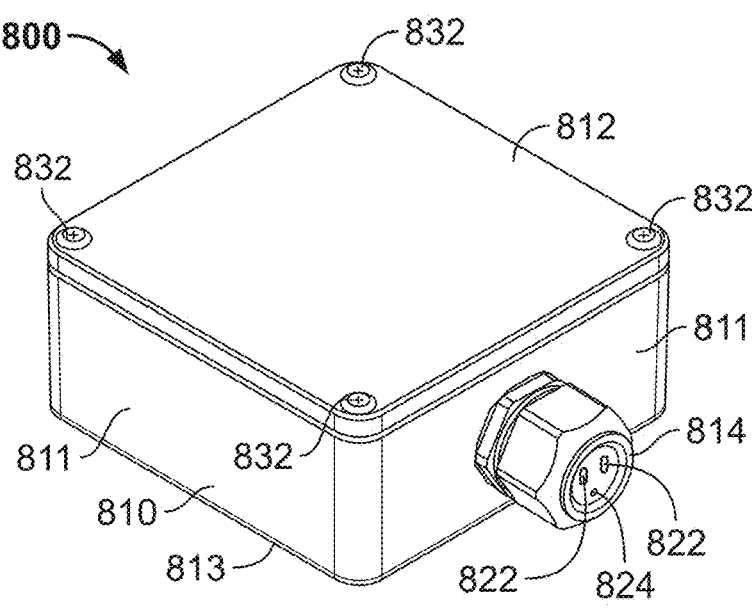
FIG. 27A illustrates a top perspective view of a junction box according to an embodiment.
FIG. 27B illustrates an exploded view of the junction box of FIG. 27A.

In some embodiments, for example as shown in FIG. 27B, housing 810 may include at least one barrel portion 808 in one or more corners of housing 810. Barrel portion 808 may include a longitudinal hole 828. In some embodiments, lid 812 may include one or more through holes 826, which may be disposed in each of the corners of lid 812, and may be aligned with longitudinal holes 828 such that a fastener (e.g., screw, bolt, nail, etc.) 832 may be inserted through the through holes 826 into longitudinal holes 828 to secure lid 812 to housing 810.

Figure 28:
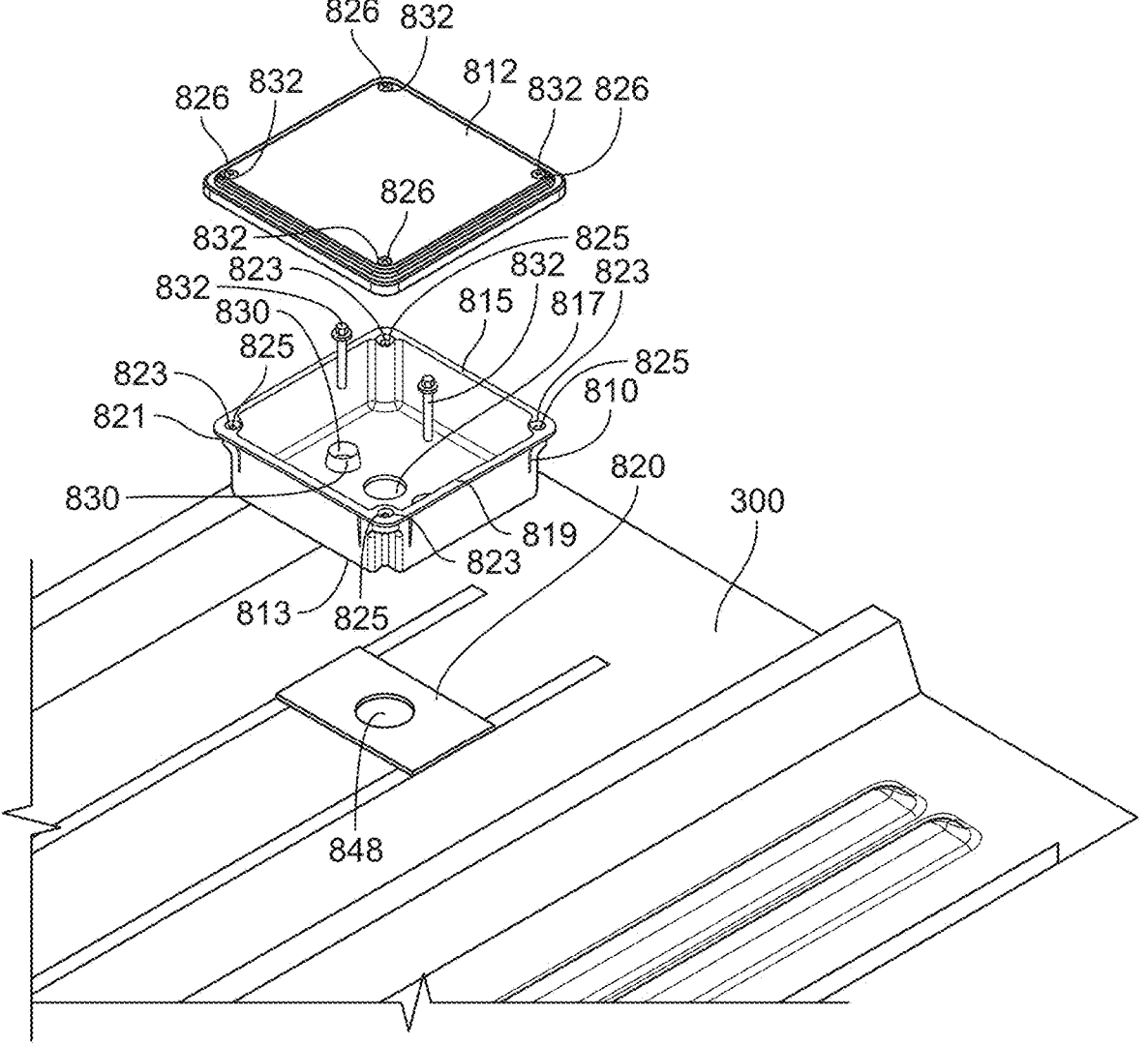
FIG. 28 illustrates an exploded view of a junction box assembly during installation according to an embodiment.
Figure 29:
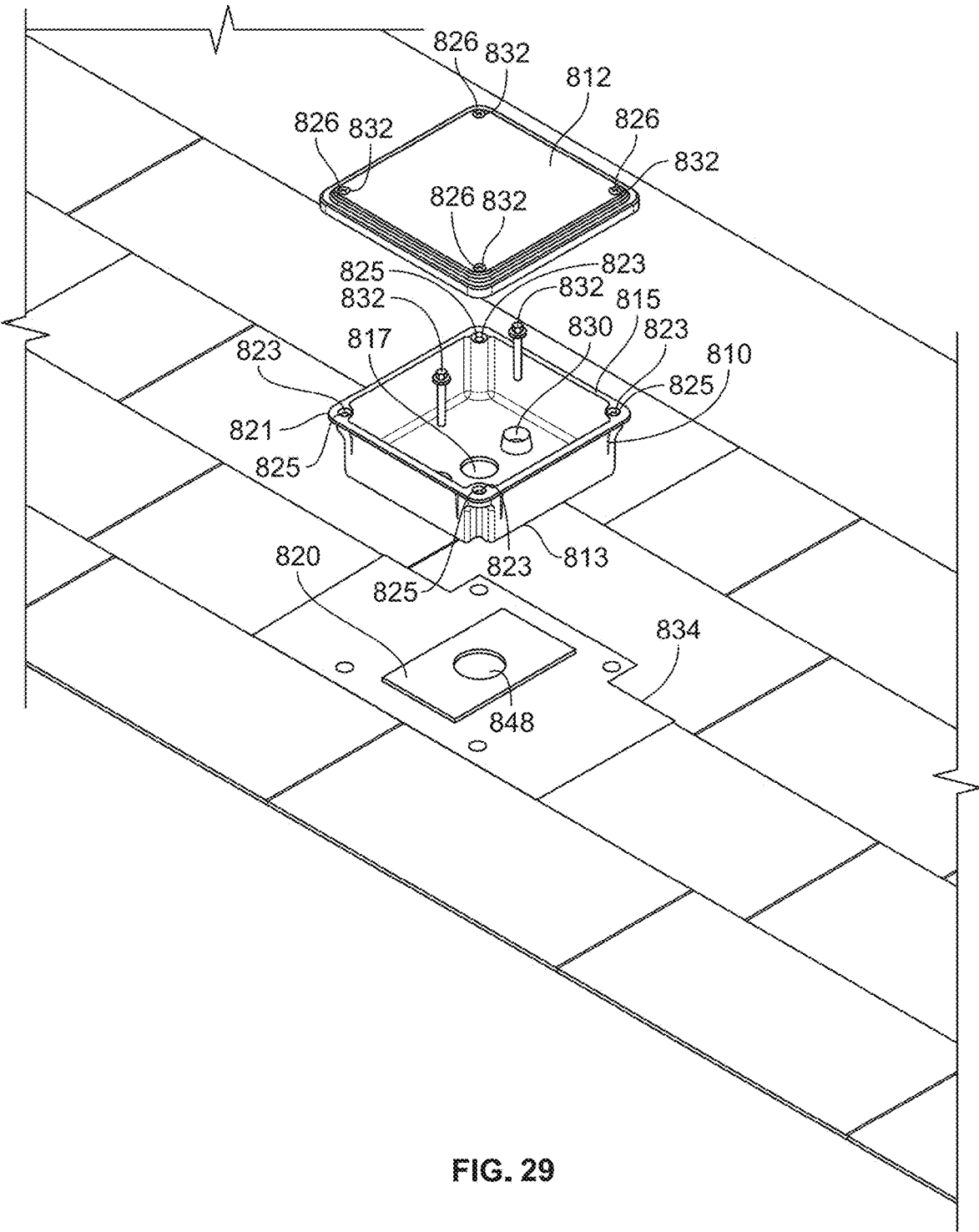
FIG. 29 illustrates an exploded view of a junction box assembly during installation according to an embodiment.

In some embodiments, through holes 818 are configured to receive fasteners. For example, as shown in FIGS. 28 and 29, junction box 800 may be attached to a roof, for example, with fasteners, such as fasteners 832 (e.g., screw, bolt, nail, etc.), which may be installed via through holes 818. In some embodiments, junction box 800 may be disposed on and/or coupled to roofing panel 300. In some embodiments, a hole may be drilled in the roof (and/or roofing panel 300) through which conduit stub 816 of junction box 800 may be inserted. In some embodiments, conduit stub 816 may be positioned concentric with conduit through hole 817. In some embodiments, an exterior portion 809 of conduit stub 816 may extend downwardly from conduit through hole 817. In some embodiments, an interior portion 807 of conduit stub 816 may also extend upward from an inner surface 850 of bottom 813 of housing 810.

In some embodiments, through holes 818 may be surrounded by a rim 830, extending upward from inner surface 850 of bottom 813 of housing 810. Rim 830 may aid in preventing water from flowing into through holes 818, which may help prevent corrosion of fasteners that may be used to secure junction box 800 to the roof and leaking of water into the roof. In some embodiments, rim 830 may aid in preventing contact between fasteners 832 and the electrical connections extending from the PV modules.

In some embodiments, for example as shown in FIG. 29, junction box 800 may be installed onto a junction box flashing 834. Junction box flashing 834 may be installed onto a roof having previously-installed PV modules, and may allow for junction box 800 to be retrofit with the PV module mounting system that may already be installed on a roof. In some embodiments, junction box flashing 834 may provide a barrier between junction box 800 and a roof in order to prevent water from leaking into the roof.

In some embodiments, a seal 820 may be disposed on bottom 813 of housing 810, which may prevent water from leaking into the roof through conduit through hole 817. In some embodiments, seal 820 may cover a majority of an outer surface of bottom 813 of housing 810. In some embodiments, seal 820 may be a butyl seal. In some embodiments, seal 820 may be composed of any waterproof material suitable to form a seal between junction box 800 and a roof. In some embodiments, seal 820 may also include an adhesive surface, which may aid in creating a seal between junction box 800 and a roof, and may improve ease of installation. In some embodiments, a removable sheet may be coupled to the adhesive surface to keep the adhesive surface clean prior to installation. The removable sheet may be removed prior to installation, thereby exposing the adhesive surface.

In some embodiments, seal 820 may include one or more through holes 846, which may align with through holes 818 in the bottom 813 of housing 810 to allow fasteners to pass through seal 820. In some embodiments, seal 820 may not include any fastener through holes, but rather have fasteners penetrate through the material of seal 820, which may improve the water-tight seal between the junction box 800 and the roof, for example by having the material of seal 820 mate with the threading of a screw as it is driven into the roof. Seal 820 may also include a conduit through hole 848, which may be concentric with conduit through hole 817. This may allow the conduit stub 816 to pass through the seal 820.

In some embodiments, top edge 815 of housing 810 may include a lip 819 disposed around the perimeter of top edge 815, which may project upward from top edge 815. Lip 819 may be configured to mate with a recess on an underside of lid 812, and may aid in blocking the flow of water into housing 810 by providing a barrier between lid 812 and top edge 815. In some embodiments, the recess on the underside of lid 812 may contain a gasket or a sealing element. In some embodiments, for example as shown in FIGS. 28 and 29, top edge 815 may form a flange 821 extending radially from sides 811 of housing 810. Flange 821 may include one or more recesses 823 and one or more through holes 825 disposed within recesses 823. In some embodiments, lid 812 may also include one or more through holes 826, which may align with through holes 825. In some embodiments, through holes 825 and through holes 826 may both be configured to receive a fastener (e.g., screw, bolt, nail, etc.) to secure lid 812 to top edge 815.

As shown in FIGS. 25B-27B, for example, in some embodiments, wires or other electrical components may be introduced into junction box 800 via a cable gland 814, which may extend radially outward from a side 811 of housing 810, for example through an aperture 806 in a side 811 of housing 810. The wires may then be routed through conduit through hole 817 and conduit stub 816, for example, into a building (e.g., into an attic of a house). In some embodiments, for example as shown in FIG. 27A, cable gland 814 may include at least one cable port 822 and a grounding wire port 824.

Figure 30A:
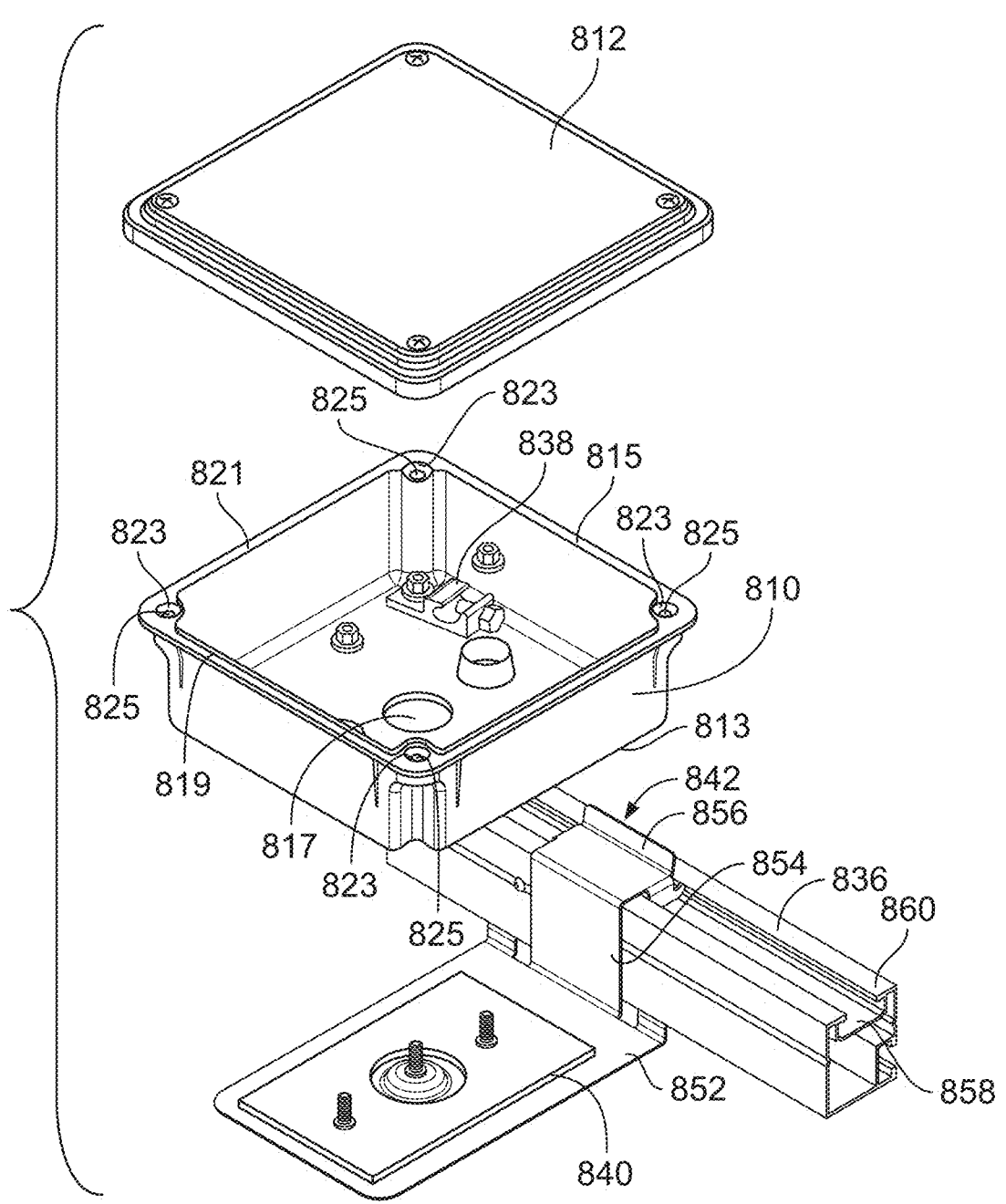
FIG. 30A illustrates an exploded view of a junction box assembly according to an embodiment.
Figure 30B:
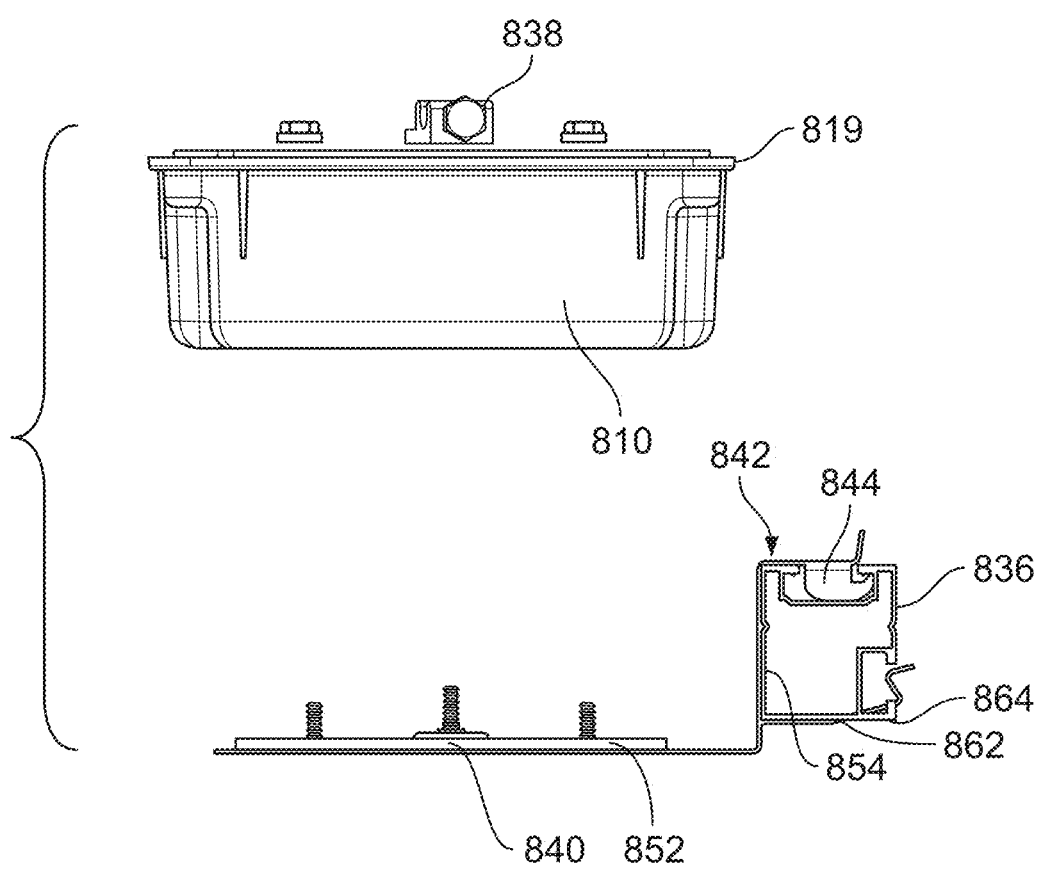
FIG. 30B illustrates a side view of the junction box assembly of FIG. 30A.

In some embodiments, for example as shown in FIGS. 30A and 30B, a grounding bracket 842 may be removably coupled to the bottom 813 of housing 810 to facilitate coupling junction box 800 to the roof. In some embodiments, grounding bracket 842 may couple junction box 800 to a mounting rail 836 of a PV module mounting system. Grounding bracket 842 may enable junction box 800 to be retrofit onto various PV module mounting systems which include rails, such as mounting rail 836. In some embodiments, grounding bracket 842 may include a pan portion 852, which may be configured to support bottom 813 of housing 810 of junction box 800, an upright portion 854, extending generally perpendicular to pan portion 852, and an upper flange portion 856 extending from upright portion 854.

Upper flange portion 856 of grounding bracket 842 may be configured to engage a channel 858 in an upper surface 860 of mounting rail 836. In some embodiments, grounding bracket 842 may engage channel 858 via a flange 844, which may be configured to hook into channel 858. In some embodiments, grounding bracket 842 may also include a lower flange portion 862 extending from upright portion 854. Lower flange portion 862 may be configured to be disposed under a bottom surface 864 of mounting rail 836, and may hook onto mounting rail 836 to provide additional stability. In some embodiments, grounding bracket 842 may be coupled to housing 810 using at least one fastener.

Figure 31:
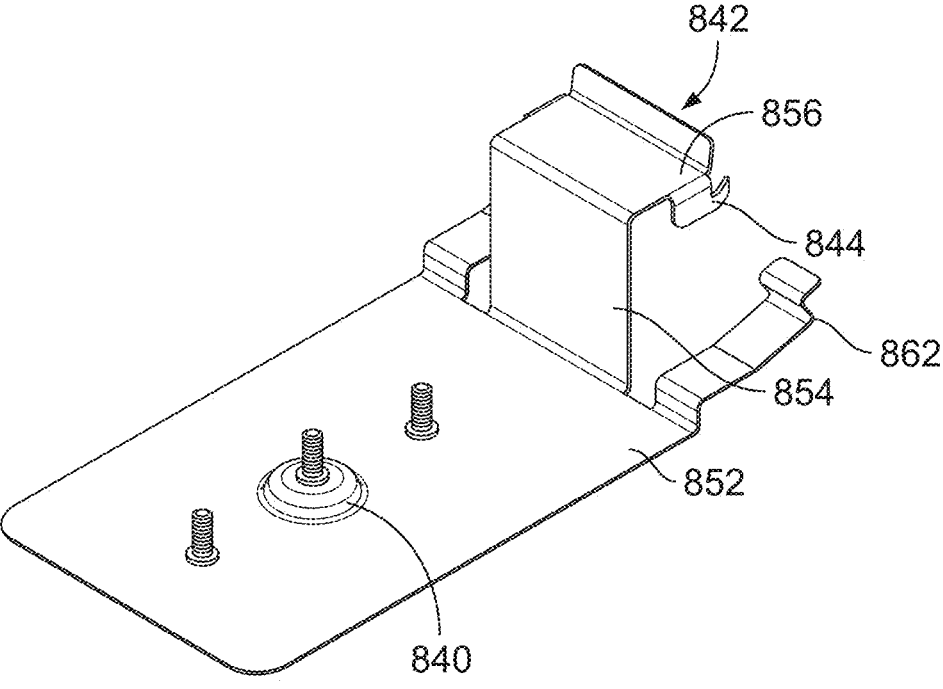
FIG. 31 illustrates a top perspective view of a grounding bracket according to an embodiment.

In some embodiments, for example as shown in FIG. 30A, junction box 800 may include a grounding element, for example grounding lug 838. Grounding bracket 842 may also include a grounding element 840 (e.g., a grounding screw or post), for example as shown in FIGS. 30A-31, disposed on a top surface of pan portion 852 of grounding bracket 854, which may extend through conduit through hole 817 into the interior of housing 810. In some embodiments, a grounding path may be formed from grounding lug 838 and grounding element 840 to mounting rail 836.

It is to be appreciated that the Detailed Description section, and not the Summary and Abstract sections, is intended to be used to interpret the claims. The Summary and Abstract sections may set forth one or more but not all exemplary embodiments of the present embodiments as contemplated by the inventor(s), and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A bracket assembly for securing a photovoltaic (PV) module, the bracket assembly comprising:
a bracket including:
a top surface, and
a bottom surface;
a clip disposed within the bracket, the clip comprising a hooked portion; and
a biasing member including:
a first end attached to an edge of the bracket, and
a second end attached to the clip,
wherein the clip is configured to be displaced by a PV module from a first position to a second position,
wherein the clip is biased toward the first position, and
wherein the hooked portion is configured to engage an edge feature of the PV module.

2. The bracket assembly of claim 1, wherein the clip is coupled to a spring, and wherein the spring is configured to bias the clip toward the first position.

3. The bracket assembly of claim 1, wherein the hooked portion comprises a sloped upper portion.

4. The bracket assembly of claim 1, wherein the hooked portion comprises an undercut lower portion having a lip, wherein the lip is configured to engage the edge feature of the PV module.

5. The bracket assembly of claim 1, wherein the hooked portion is configured to engage the edge feature of the PV module when the clip returns from the second position to the first position.

6. The bracket assembly of claim 2, wherein the spring is coupled to a first end of the bracket and to an end of the clip.

7. The bracket assembly of claim 6, wherein the spring extends through an aperture in the end of the clip.

8. The bracket assembly of claim 3, wherein the sloped upper portion forms an oblique angle with respect to the top surface.

9. The bracket assembly of claim 1, wherein the clip is disposed in a channel of the bracket.

10. The bracket assembly of claim 9, wherein the clip is coupled to a spring disposed in the channel of the bracket.

11. The bracket assembly of claim 1, wherein the bracket further comprises a recess defined between a first ledge that forms the top surface and a second ledge spaced apart from the first ledge.

12. The bracket assembly of claim 11, wherein the clip comprises a clip base disposed in the recess.

13. The bracket assembly of claim 1, further comprising a slider flange extending into a channel in the bracket, wherein the stop slider flange is configured to engage the clip.

* * * * *